US011222061B2

(12) United States Patent
Zhao et al.

(10) Patent No.: US 11,222,061 B2
(45) Date of Patent: Jan. 11, 2022

(54) GENERATING DIGITAL MEDIA CLUSTERS CORRESPONDING TO PREDICTED DISTRIBUTION CLASSES FROM A REPOSITORY OF DIGITAL MEDIA BASED ON NETWORK DISTRIBUTION HISTORY

(71) Applicant: Facebook, Inc., Menlo Park, CA (US)

(72) Inventors: Yue Zhao, Orinda, CA (US); Yu Wang, San Mateo, CA (US); William Samuel Bailey, San Francisco, CA (US); Mari Sheibley, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 255 days.

(21) Appl. No.: 16/444,996

(22) Filed: Jun. 18, 2019

(65) Prior Publication Data

US 2020/0311120 A1  Oct. 1, 2020

Related U.S. Application Data

(60) Provisional application No. 62/825,708, filed on Mar. 28, 2019.

(51) Int. Cl.
*G06F 16/45* (2019.01)
*G06F 16/435* (2019.01)
(Continued)

(52) U.S. Cl.
CPC ............ *G06F 16/45* (2019.01); *G06F 16/432* (2019.01); *G06F 16/435* (2019.01);
(Continued)

(58) Field of Classification Search
CPC ...... G06F 16/45; G06F 16/435; G06F 16/432; G06F 16/90324; G06N 30/08; G06N 20/00; G06N 3/08; G06K 9/6218; G06K 9/628
(Continued)

(56) References Cited

U.S. PATENT DOCUMENTS

| 8,175,989 B1 * | 5/2012 | Gopinath | G06N 7/005 706/45 |
| 8,332,392 B2 * | 12/2012 | Brzozowski | G06F 16/9535 707/722 |

(Continued)

OTHER PUBLICATIONS

International Search Report & Written Opinion as received in PCT/US2020/025789 dated Jun. 29, 2020.
(Continued)

*Primary Examiner* — Phuong Thao Cao
(74) *Attorney, Agent, or Firm* — Keller Jolley Preece

(57) ABSTRACT

The present disclosure relates to systems, non-transitory computer-readable media, and methods for generating accurate digital media clusters corresponding to predicted distribution classes from a repository of digital media based on network distribution history. For example, a digital media clustering system can apply machine learning models at a remote server (based on network distribution history of a network account of a user) to generate predicted distribution classes for future electronic communications. The remote server can provide the predicted distribution classes to a user client device for secure local analysis of digital media stored at the client device. Based on the predicted distribution classes and the stored digital media, the client device can suggest digital media items to distribute via a networking system. Thus, the disclosed system can surface digital media content without providing any information regarding the digital media items stored at the client device to a remote server.

20 Claims, 16 Drawing Sheets

(51) Int. Cl.
*G06N 20/00* (2019.01)
*G06K 9/62* (2006.01)
*G06F 16/9032* (2019.01)
*G06F 16/432* (2019.01)
*G06N 3/08* (2006.01)

(52) U.S. Cl.
CPC ....... *G06F 16/90324* (2019.01); *G06K 9/628* (2013.01); *G06K 9/6218* (2013.01); *G06N 3/08* (2013.01); *G06N 20/00* (2019.01)

(58) Field of Classification Search
USPC .......................................................... 707/737
See application file for complete search history.

(56) References Cited

U.S. PATENT DOCUMENTS

| | | | | |
|---|---|---|---|---|
| 8,554,873 | B1* | 10/2013 | Ganesh | G06F 16/24578 709/217 |
| 8,738,433 | B2* | 5/2014 | DiOrio | G06Q 30/0255 705/14.1 |
| 9,589,237 | B1* | 3/2017 | Qamar | G06Q 30/0631 |
| 9,602,402 | B2* | 3/2017 | Jeong | H04L 45/74 |
| 9,633,312 | B1* | 4/2017 | Baluja | G06F 16/2457 |
| 9,674,128 | B1* | 6/2017 | Browning | H04L 51/16 |
| 9,864,951 | B1* | 1/2018 | Makhijani | G06F 40/274 |
| 10,346,870 | B1* | 7/2019 | Chang | G06Q 30/0242 |
| 10,360,631 | B1* | 7/2019 | Jezewski | G06Q 40/06 |
| 10,373,212 | B2* | 8/2019 | Systrom | G06Q 30/0277 |
| 10,693,944 | B1* | 6/2020 | Rane | H04L 67/06 |
| 10,783,399 | B1* | 9/2020 | Bruno | G06K 9/6218 |
| 10,902,345 | B2* | 1/2021 | Cavalin | G06Q 30/02 |
| 11,095,597 | B2* | 8/2021 | Hande | G06Q 50/01 |
| 2007/0112614 | A1* | 5/2007 | Maga | G06Q 30/02 705/7.33 |
| 2007/0244986 | A1* | 10/2007 | Svendsen | H04N 21/41407 709/217 |
| 2009/0168752 | A1* | 7/2009 | Segel | H04N 21/24 370/351 |
| 2010/0229190 | A1* | 9/2010 | Koo | H04N 21/4524 725/14 |
| 2011/0208681 | A1* | 8/2011 | Kuecuekyan | G06N 20/00 706/21 |
| 2011/0258256 | A1* | 10/2011 | Huberman | G06F 40/295 709/204 |
| 2011/0270671 | A1* | 11/2011 | Tang | G06Q 30/02 705/14.41 |
| 2012/0321192 | A1* | 12/2012 | Marshall | G06Q 10/107 382/190 |
| 2013/0141235 | A1* | 6/2013 | Utter, II | G08B 21/02 340/539.12 |
| 2014/0081769 | A1* | 3/2014 | Wilen | G06Q 20/3437 705/14.66 |
| 2014/0095606 | A1 | 4/2014 | Matus | |
| 2015/0019480 | A1* | 1/2015 | Maquaire | G06F 16/23 707/609 |
| 2015/0081609 | A1* | 3/2015 | Hande | G06Q 50/01 706/46 |
| 2015/0142717 | A1* | 5/2015 | Guiver | G06Q 10/107 706/46 |
| 2015/0142888 | A1* | 5/2015 | Browning | H04L 67/22 709/204 |
| 2015/0186535 | A1* | 7/2015 | Patil | G06F 3/04817 707/710 |
| 2015/0310188 | A1* | 10/2015 | Ford | H04L 63/0428 726/28 |
| 2015/0373281 | A1* | 12/2015 | White | G11B 27/002 348/660 |
| 2016/0109941 | A1* | 4/2016 | Govindarajeswaran | G06F 16/5838 345/156 |
| 2016/0205254 | A1* | 7/2016 | Luers | H04M 3/5232 379/265.14 |
| 2016/0239519 | A1* | 8/2016 | Levy | G06T 5/003 |
| 2016/0360382 | A1* | 12/2016 | Gross | H04W 4/029 |
| 2017/0017639 | A1* | 1/2017 | Bute | G06F 40/242 |
| 2017/0031575 | A1* | 2/2017 | Dotan-Cohen | G06F 3/04847 |
| 2017/0140041 | A1* | 5/2017 | Dotan-Cohen | G06Q 10/101 |
| 2017/0140285 | A1* | 5/2017 | Dotan-Cohen | H04W 4/02 |
| 2017/0195731 | A1* | 7/2017 | Girlando | H04N 21/4668 |
| 2017/0228700 | A1* | 8/2017 | Kim | G06N 5/04 |
| 2017/0255862 | A1* | 9/2017 | Li | H04L 67/10 |
| 2017/0293623 | A1* | 10/2017 | Kimball | H04L 51/32 |
| 2017/0323340 | A1* | 11/2017 | Jeon | H04L 67/20 |
| 2017/0357890 | A1 | 12/2017 | Kim et al. | |
| 2018/0027296 | A1* | 1/2018 | Lea | H04N 21/475 725/50 |
| 2018/0189676 | A1* | 7/2018 | Predovic | G06Q 10/10 |
| 2018/0260840 | A1* | 9/2018 | Jeon | H04L 67/22 |
| 2018/0262803 | A1* | 9/2018 | Benedetto | H04N 21/25891 |
| 2018/0268318 | A1* | 9/2018 | Matam | G06N 20/00 |
| 2018/0276561 | A1* | 9/2018 | Pasternack | G06N 20/20 |
| 2018/0330192 | A1* | 11/2018 | Atasu | G06K 9/6226 |
| 2018/0373794 | A1* | 12/2018 | Dimson | G06N 5/022 |
| 2019/0050748 | A1* | 2/2019 | Cmielowski | G06Q 30/0204 |
| 2019/0065978 | A1* | 2/2019 | Martine | H04L 67/20 |
| 2019/0362263 | A1* | 11/2019 | Harris | G06N 20/00 |
| 2020/0012965 | A1* | 1/2020 | Silansky | G06K 9/6262 |
| 2020/0175112 | A1* | 6/2020 | Dunne | H04L 51/04 |
| 2021/0090191 | A1* | 3/2021 | Chan | G06N 5/022 |

OTHER PUBLICATIONS

Pengcheng Wu et al: "Online multimodal deep similarity learning with application to image retrieval", Proceedings of the 21ST ACM International Conference on Multimedia, MM '13, Jan. 1, 2013 (Jan. 1, 2013), pp. 153-162, XP055335747,New York, New York, USA DOI: 10.1145/2502081.2502112 ISBN: 978-1-4503-2404-5 p. 154, paragraph 2.1.

Zheng Xianghan et al: "Clustering based interest prediction in social networks", Multimedia Tools and Applications, Kluwer Academic Publishers, Boston, US, vol. 78, No. 23, Mar. 8, 2019 (Mar. 8, 2019), pp. 32755-32774, XP036933120, ISSN: 1380-7501, DOI 10.1007/S11042-018-7009-Y [retrieved on Mar. 8, 2019] p. 32755- p. 32758.

Tim Donkers et al: "Sequential User-based Recurrent Neural Network Recommendations", Recommender Systems, ACM, 2 Penn Plaza, Suite 701NEW YORKNY10121-0701USA, Aug. 27, 2017 (Aug. 27, 2017), pp. 152-160, XP058371847, DOI: 10.1145/3109859. 3109877 ISBN 978-1-4503-4652-8 the whole document.

* cited by examiner

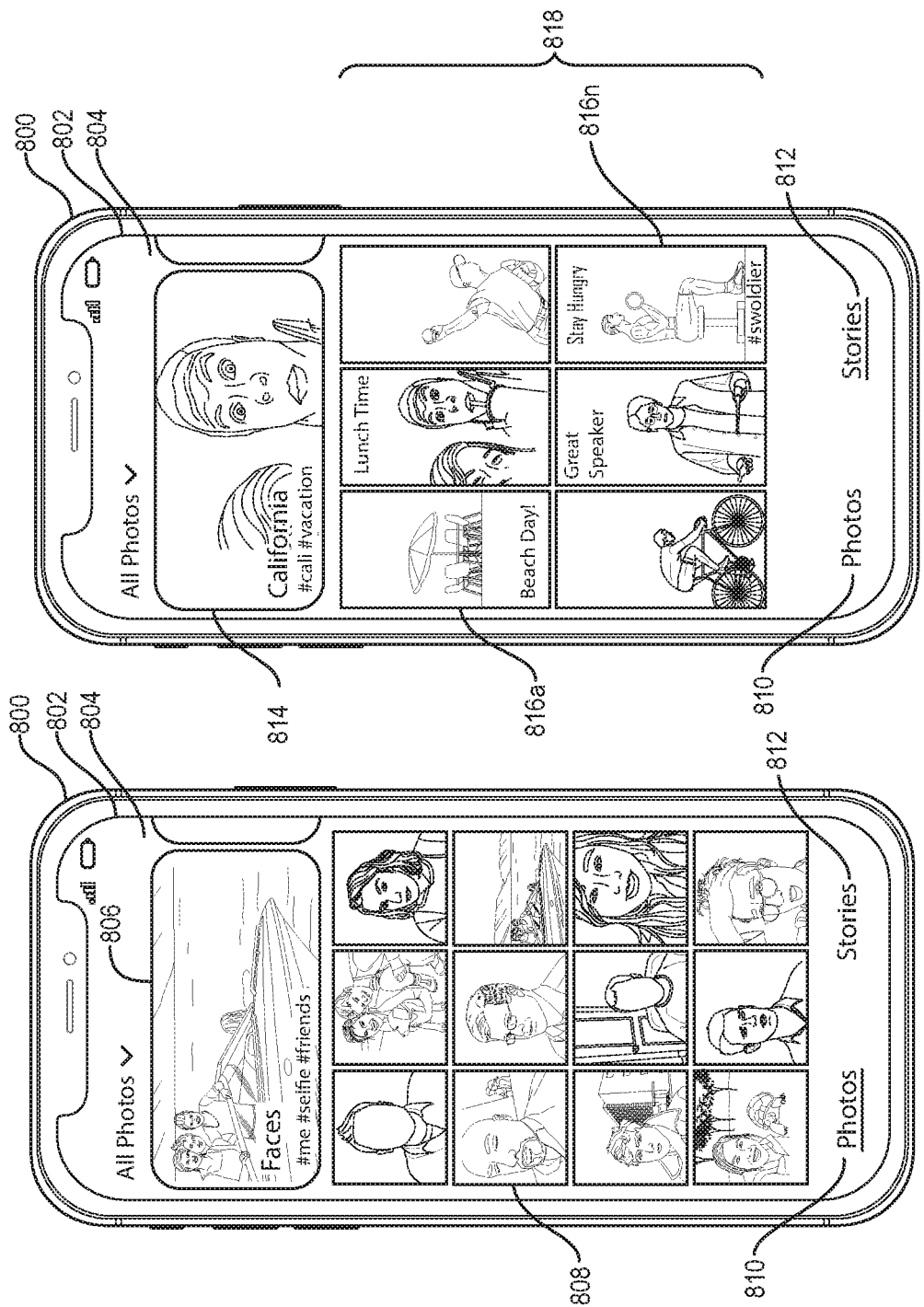

GENERATING DIGITAL MEDIA CLUSTERS CORRESPONDING TO PREDICTED DISTRIBUTION CLASSES FROM A REPOSITORY OF DIGITAL MEDIA BASED ON NETWORK DISTRIBUTION HISTORY

CROSS REFERENCE TO RELATED APPLICATIONS

This application claims priority to and the benefit of U.S. Provisional Application No. 62/825,708, filed Mar. 28, 2019. The aforementioned application is hereby incorporated by reference in its entirety.

BACKGROUND

Recent years have seen significant technological improvements in hardware and software platforms for transmitting digital content stored in diverse media repositories corresponding to multiple client devices across computer networks. For example, conventional digital content transmission systems can select and transmit digital images or digital video stored at a client device to multiple recipient client devices together with various electronic messages (e.g., social networking posts or instant messaging communications). Moreover, conventional digital content transmission systems can organize digital media repositories (e.g., based on date) to allow for selection and transmission of previously captured digital files to other client devices (e.g., as part of an electronic message crafted for other client device users).

Despite these advancements, conventional digital content transmission systems have a number of problems in relation to efficiency, accuracy, security, and flexibility of operation. As one example, conventional systems are inefficient in that they require excessive interactions with various user interfaces to identify and transmit digital content from large digital media repositories. Indeed, it is now common for individual client devices to store thousands of digital media items. To identify a particular digital content item from such repositories using current digital content transmission systems requires a significant amount of time and user interactions to sort, scroll, and review individual digital files.

In addition, conventional digital content transmission systems are also inaccurate. Indeed, conventional digital content transmission systems often identify and transmit digital content that fails to accurately correspond to user intent and/or corresponding electronic messages. Indeed, users of client devices often seek to generate an electronic communication that conveys a particular concept, and conventional systems often result in inaccurate misalignment between identified digital content and the particular concept conveyed in a digital message. In some instances, the inaccuracy and inefficiency of conventional systems leads client device users to abandon the effort of generating and transmitting electronic messages (and/or to leave digital content transmission system for alternative systems).

Conventional systems also have shortfalls in relation to digital security. Indeed, many conventional digital content transmission systems operate at remote servers. Conventional systems, thus, access and analyze digital content stored at individual client devices via these remote servers. However, recent years have seen a steady increase in the number of digital attacks and security breaches at servers that maintain client information. Accordingly, conventional systems can introduce digital privacy and security concerns with regard to sensitive client information accessed by remote servers on client devices.

In addition, conventional systems are inflexible. For instance, conventional digital content transmission systems provide a rigid approach to identifying and transmitting digital content to users. To illustrate, conventional digital content transmission systems provide the same sorting and analysis tools (e.g., sort-by-date) for all users, across all accounts, for all client devices. This rigid approach further contributes to the inaccuracies and inefficiencies of conventional systems discussed above.

These along with additional problems and issues exist with regard to conventional digital content transmission systems.

SUMMARY

Embodiments of the present disclosure provide benefits and/or solve one or more of the foregoing or other problems with systems, non-transitory computer-readable media, and methods for generating accurate digital media clusters corresponding to predicted distribution classes from a repository of digital media based on network distribution history. For instance, the disclosed systems can surface digital media that accurately portray moments that users seek to distribute to other client devices. In particular, the disclosed systems utilize machine learning models to identify digital content suggestions that accurately identify what digital media items (and styles) client device users seek to share based on network distribution history.

Furthermore, in one or more embodiments, the disclosed systems improve privacy and security by performing analysis of network distribution history at remote servers, analyzing private digital media repositories at client devices, and then aligning the two analyses at the client device to surface accurate digital media suggestions. For example, the disclosed system can apply machine learning models at a remote server (based on previously shared information) to generate predicted distribution classes. The remote server can provide the predicted distribution classes for secure local analysis of the digital media stored at the client device. Thus, the disclosed system can surface digital media content without providing information regarding the digital media items to a remote server or overloading computing resources at the client device. In this manner, the disclosed systems can reduce time and interaction barriers to sharing digital content, accurately surface digital media, improve security and user privacy, and flexibly tailor digital content suggestions to particular users and accounts.

Additional features and advantages of one or more embodiments of the present disclosure are provided in the description which follows, and in part will be apparent from the description, or may be learned by the practice of such example embodiments.

BRIEF DESCRIPTION OF THE DRAWINGS

The detailed description provides one or more embodiments with additional detail through the use of the accompanying drawings, as briefly described below.

FIGS. 8A-8B illustrate a computing device with a user interface portraying digital media clusters and ephemeral digital content in accordance with one or more embodiments.

DETAILED DESCRIPTION

Figure 1:
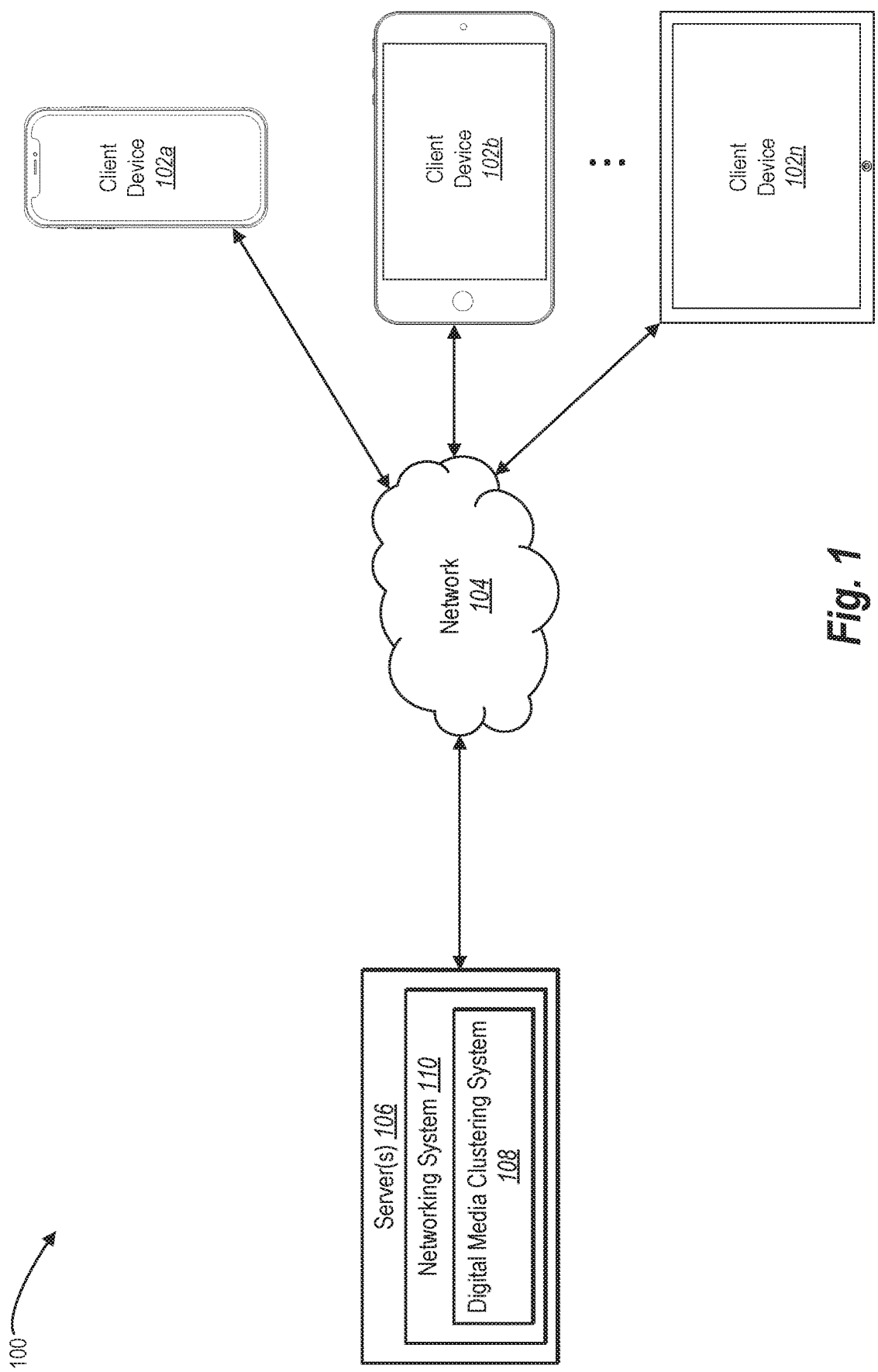
FIG. 1 illustrates a schematic diagram of an environment in which a digital media clustering system operates in accordance with one or more embodiments.

One or more embodiments of the present disclosure include a digital media clustering system that generates digital media clusters corresponding to predicted distribution classes from a repository of digital media based on network distribution history. For instance, the digital media clustering system can analyze public information (e.g., previous networking posts) at a server, while securely analyzing digital media repositories at a client device. The digital media clustering system can combine the analysis performed at the server with the analysis performed at the client device to efficiently surface suggested digital media clusters without transferring information regarding sensitive client digital media from the client device.

To illustrate, in one or more embodiments, the digital media clustering system (at a remote server) identifies a networking system profile that includes a network distribution history corresponding to a network account of a user. Based on the network distribution history, the digital media clustering system can utilize a distribution classification model (e.g., a machine learning model such as a neural network) to generate a predicted distribution class for a future electronic communication corresponding to the network account of the user. Moreover, the digital media clustering system can provide the predicted distribution class to a client device (e.g., from the remote server).

At the client device, the digital media clustering system can generate a plurality of digital media clusters from a digital media repository. Specifically, in one or more embodiments, the digital media clustering system applies a media cluster model (e.g., one or more machine learning models) to a digital media repository stored on the client device to generate these digital media clusters. The digital media clustering system can then identify and utilize the predicted distribution class (the predicted distribution class generated at the remote server) to select a digital media cluster (from the plurality of digital media clusters). In one or more embodiments, the digital media clustering system provides the digital media cluster for display and, based on user interaction with a digital media item from the digital media cluster, provides the digital media item for distribution via a networking system.

As just mentioned in the foregoing example, the digital media clustering system can analyze network distribution history of an account corresponding to a user at a remote server while analyzing sensitive client information only at the client device. Indeed, by generating a distribution class at the remote server (based on public network distribution history) and then utilizing the distribution class at the client device to analyze a digital media repository, the digital media clustering system can surface digital media clusters without transferring information regarding sensitive digital media from the client device.

As mentioned above, in one or more embodiments, the digital media clustering system utilizes a distribution classification model to generate predicted distribution classes. In particular, the digital media clustering system can utilize a distribution classification model that includes one or more machine learning models to analyze a network distribution history and generate predicted distribution classes for a future electronic communication. For example, the digital media clustering system can analyze previous social networking posts from an account of a user and utilize machine learning to predict a classification for future electronic communications (e.g., a network account class that indicates the digital media items most likely to be distribution in the future). In this manner, the digital media clustering system can determine a predicted distribution class that reflects the topics, structure, style, and trends from previous content distributions for a network account of a user.

Moreover, as mentioned above, the digital media clustering system can also utilize a media cluster model to generate digital media clusters from a digital media repository at a client device. In particular, the digital media clustering system can utilize a media cluster model that itself includes a variety of machine learning approaches (e.g., facial recognition, object recognition, temporal and geographic clustering, composition quality models) to generate digital media clusters. In some embodiments, the digital media clustering system generates digital media clusters that correspond to different distribution classes. For example, the digital media clustering system can generate digital media clusters that portray digital images of a particular topic that is also reflected in a distribution classification (e.g., generate a cluster of digital images that portray dogs that corresponds to a dog distribution classification).

The digital media clustering system can utilize the digital media clusters together with predicted distribution classes to suggest digital media clusters that a client device user is most likely to distribute to other client devices. Indeed, the digital media clustering system can align predicted distribution classes (that reflect historical trends from previous content distribution) with the digital media clusters generated from the digital media repository stored on the client device to suggest those digital media clusters that are most pertinent to a user account. For example, in one or more embodiments, the digital media clustering system ranks digital media clusters based on predicted distribution classes and selects a digital media cluster to surface at the client device based on the ranking.

Upon identifying one or more suggested digital media clusters, the digital media clustering system can provide the suggested digital media clusters for display via the client device of the user. For example, the digital media clustering system can select a representative image of each suggested digital media cluster (e.g., a representative card) and provide the representative image for display. Upon user selection of the representative image, the digital media clustering system can provide each digital media item in the digital media cluster for display. A user can select one or more digital media items for distribution via a networking system (e.g., to post to a social networking system).

In addition to suggesting digital media, the digital media clustering system can also automatically edit digital media based on network distribution history. For example, the digital media clustering system can determine from network distribution history previous digital media style modifications that a user has applied in distributing digital content via a networking system. The digital media style modification can automatically apply these digital style modifications in generating and providing digital media clusters.

The digital media clustering system can also suggest ephemeral digital content that an account of a user has previously distributed via a networking system. Indeed, in some embodiments, the digital media clustering system can resurface ephemeral digital content previously distributed by a user, which is no longer publicly available. For example, an account of a user can share (e.g., post) ephemeral digital content that is hidden from public view and the user client device after a triggering event (e.g., after the ephemeral digital content is viewed or after a threshold period of time). The digital media clustering system can analyze this historical ephemeral digital content (e.g., at a remote server) and utilize the distribution class model to predict ephemeral digital content that a user is most likely to distribute in a future electronic communication. The digital media clustering system can provide predicted ephemeral digital content to the client device (e.g., for display with other digital media clusters identified at the client device).

As explained above, the digital media clustering system provides numerous advantages, benefits, and practical applications relative to conventional systems. For instance, the digital media clustering system improves efficiency relative to conventional systems. In particular, by generating suggested digital media clusters based on network distribution history, the digital media clustering system can reduce the time and user interactions required to locate digital media items from within large digital media repositories. For example, the digital media clustering system can generate a user interface that portrays digital media clusters that a user is most likely to utilize and distribute in future messages. Users can thus identify and distribute digital media items with only a handful of interactions in significantly less time.

In addition, the digital media clustering system improves accuracy relative to conventional systems. Indeed, by generating digital media clusters that include digital media items that a network account is most likely to distribute, the digital clustering system can more accurately align digital media with pertinent communications. Indeed, the digital clustering system can identify digital media that corresponds to user intent and electronic communications, which improves the electronic messages and avoids abandonment of implementing systems.

Moreover, the digital media clustering system also improves security of implementing computing devices without overloading computing resources of individual client devices. As mentioned above, the digital media clustering system can analyze previously shared information at remote servers to generate predicted distribution classes. The digital media clustering system can then analyze a digital media repository at the client device with these predicted distribution classes to select relevant digital media clusters. Accordingly, the digital media clustering system can securely identify digital media clusters at the client device without transmitting sensitive client information to the remote servers. In addition, by performing analyses of network distribution history at a remote server, the digital media clustering system can reduce computing overhead at the client device and avoid overburdening local computing resources.

Further, the digital media clustering system provides increased flexibility over otherwise rigid conventional systems. As discussed above, the digital media clustering system can suggest digital media clusters that are uniquely tailored to individual users and/or accounts. Indeed, the digital media clustering system can even suggest different digital media clusters for the same user across different network accounts and devices. To illustrate, the digital media clustering system can surface a first set of digital media clusters for a first account (with a first focus) and a surface a second set of digital media clusters for a second account of the user (with a second focus). Thus, the digital media clustering system can tailor suggested digital media clusters to historical distributions and digital media of individual users, accounts, and devices.

As illustrated by the foregoing discussion, the present disclosure utilizes a variety of terms to describe features and advantages of the digital media clustering system. Additional detail is now provided regarding these and other terms used herein. For example, as used herein, the term "digital media item" (or "digital media") refers to a file comprising digital media. In particular, a digital media item includes a digital image, digital audio, or digital video file. For example, the term "digital media" includes digital images with the following file extensions: JPG, TIFF, BMP, PNG, RAW, or PDF. Similarly, "digital media" includes digital videos with the following file extensions: FLV, GIF, MOV, QT, AVI, WMV, MP4, MPG, MPEG, or M4V.

As used herein, the term "digital media cluster" (or "cluster" or "cluster of digital media items") refers to a set of one or more digital media items. In particular, a digital media cluster can include a set of digital media items with a common characteristic. For example, a digital media cluster can include digital media items that portray a common object, person, action, or location; that share a common time characteristic (e.g., captured on the same day or in the same period of time); and/or share a common color scheme or mood.

Moreover, as used herein, the term "repository of digital media" refers to a collection of a plurality of digital media items. In particular, a repository of digital media can include a memory, database, or log of digital media items. For example, a repository of digital images can include a camera roll on a client device. Similarly, a repository of digital images stored on a client device can include a collection of thumbnails reflecting other digital media items managed (e.g., stored) on a third-party server.

As mentioned above, the digital media clustering system can also suggest "ephemeral digital content". As used herein, "ephemeral digital content" (or an "ephemeral digital content item") refers to digital content that is created and/or distributed temporarily in relation to one or more client devices. In particular, ephemeral digital content can include digital media items that are distributed to client devices via a networking system, but are hidden, removed, and/or deleted (e.g., from the distributing client device, the recipient client devices, or public servers) after a triggering event.

As discussed, the digital media clustering system can analyze a network distribution history of a network account of a user in generating digital media clusters. As used herein, the term "network distribution history" refers to digital content previously distributed via a networking system. In particular, network distribution history can include digital media, electronic messages, social media posts, or other digital content distributed via a networking system (e.g., by a user or a networking account of the user). For example, network distribution history can include previous posts of a user to a social networking system, including digital media items, captions, hashtags, or comments corresponding to the previous posts.

As used herein, the term "network account" refers to a collection of permissions, information, and data corresponding to a user of a multiuser computer system (e.g., a networking system, as described below in relation to FIGS. 14, 15). In particular, a network account can include a collection of permissions (e.g., rights to access content), electronic communications, posts, connections with other users (e.g., "friends" on a social networking system) corresponding to a user of a networking system. As described in greater detail below, a single user can have multiple accounts with different permissions, purposes, and data (e.g., a first account for distributing digital content to a first set of users regarding a pet and a second account for distributing digital content regarding to a second set of users regarding a family).

In some embodiments, the digital media clustering system maintains a network profile for each user and/or network account. As used herein, a "network profile" comprises a collection of data regarding a user and/or network account (in accordance with user privacy settings and preferences). For example, a network profile can include network distribution history, user preferences, interaction history (e.g., clicks, comments, views, reactions), location, and/or demographic information regarding a user.

As discussed, the digital media clustering system can generate distribution classes for users/accounts based on network distribution history utilizing a distribution classification model. As used herein, the term "distribution class" refers to a classification or category corresponding to a user or network account that distributes digital content. In particular, a distribution class can include a classification of a network account, user, or digital media item (from a plurality of classifications). For example, a predicted distribution class can include a predicted classification of a user/network account (or a predicted classification of future electronic messages to be distributed by the user/network account). To illustrate, the digital media clustering system can determine that a network account corresponds to a "sports" class where future electronic messages are likely to include digital media items that portray sports. Similarly, the digital media clustering system can determine a network account corresponds to an "animal" class where future electronic messages are likely to include digital media items that portray animals.

In addition, as used herein, the term "distribution classification model" refers to a computer algorithm for generating distribution classes. In particular, the distribution classification model can include a machine learning model that predicts distribution classes based on network distribution history. As used herein, the term "machine learning model" refers to a computer algorithm that can learn from and make predictions on data. In general, machine learning may operate by building models from example inputs, such as training network distribution history, to make data-driven predictions or decisions. Machine learning models can include one or more neural networks.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data (e.g., transcription training data) to tune parameters of the neural network. For example, a neural network can include a convolutional neural network, a recurrent neural network (e.g., an LSTM), or an adversarial neural network (e.g., a generative adversarial neural network).

Additional detail will now be provided regarding the digital media clustering system in relation to illustrative figures portraying example embodiments and implementations of the digital media clustering system. For example, FIG. 1 illustrates a schematic diagram of one embodiment of an example environment 100 in which a digital media clustering system 108 can operate. As shown, the environment 100 includes one or more server(s) 106 connected to a plurality of client devices 102a-102n via a network 104 (examples of which will be described in more detail below with respect to FIG. 13).

Although FIG. 1 illustrates a particular arrangement of the client devices 102a-102n, the network 104, and the server(s) 106, various additional arrangements are possible. For example, the client devices 102a-102n may directly communicate with the server(s) 106, bypassing the network 104. Or alternatively, the client devices 102a-102n may directly communicate with each other.

Similarly, although the environment 100 of FIG. 1 is depicted as having various components, the environment 100 may have additional or alternative components. For example, the environment 100 can be implemented on a single computing device with the digital media clustering system 108. In particular, the digital media clustering system 108 may be implemented in whole or in part on the client device 102a.

As shown, the environment 100 may include the server(s) 106. The server(s) 106 may generate, store, receive, and transmit a variety of types of data, including distribution classes or selected digital media items. For example, the server(s) 106 may receive data from a client device, such as the client device 102a, and send the data to another client device, such as the client device 102b, 102c, and/or 102n. The server(s) 106 can also transmit electronic messages between one or more users of the environment 100. In one example embodiment, the server(s) 106 is a data server. The server(s) 106 can also comprise a communication server or a web-hosting server. Additional details regarding the server(s) 106 will be discussed below with respect to FIG. 12.

As shown, in one or more embodiments, the server(s) 106 can include or implement all or a portion of a networking system 110 and/or the digital media clustering system 108. The networking system 110 can comprise a social networking system or a digital communications networking system. Additional detail regarding the networking system 110 is provided below (e.g., in relation to FIGS. 14 and 15).

The networking system 110 and/or the digital media clustering system 108 can comprise application(s) running on the server(s) 106 or a portion can be downloaded from the server(s) 106. For example, the digital media clustering system 108 can include a web hosting application that allows the client devices 102a-102n to interact with content hosted at the server(s) 106. To illustrate, in one or more embodiments of the environment 100, one or more client devices 102a-102n can access a webpage supported by the server(s) 106. In particular, the client device 102a can run a web application (e.g., a web browser) to allow a user to access, view, and/or interact with a webpage or website hosted at the server(s) 106.

As mentioned above, in one or more embodiments, the client devices 102a-102n store a repository of digital media. The digital media clustering system 108 can utilize the server(s) 106 and the client devices 102a-102n to suggest digital media clusters and distribute selected digital media items to other users via the networking system 110. For example, the digital media clustering system 108 can utilize the server(s) 106 to generate distribution classes by analyzing a network distribution history of a network account. The digital media clustering system 108 can transmit the distribution classes from the server(s) 106 to the client device 102a and utilize the client device 102a to generate suggested digital media clusters. Specifically, the client device 102a can analyze a repository of digital media items, generate a set of digital media clusters, and select digital media clusters to suggest based on the distribution classes from the server(s) 106. Based on user selection of a digital media item from the suggested digital media clusters, the client device 102a can transmit the digital media item to the server(s) 106 for distribution to the client devices 102b, 102n via the networking system 110.

As just described, the digital media clustering system 108 may be implemented in whole, or in part, by the individual elements 102a-106 of the environment 100. It will be appreciated that although certain components or functions of the digital media clustering system 108 are described in the previous example with regard to particular elements of the environment 100, various alternative implementations are possible. For instance, in one or more embodiments, the digital media clustering system 108 is implemented on the client device 102a. Similarly, in one or more embodiments, the digital media clustering system 108 may be implemented on the server(s) 106. Moreover, different components and functions of the digital media clustering system 108 may be implemented separately among client devices 102a-102n, the server(s) 106, and the network 104.

Figure 2:
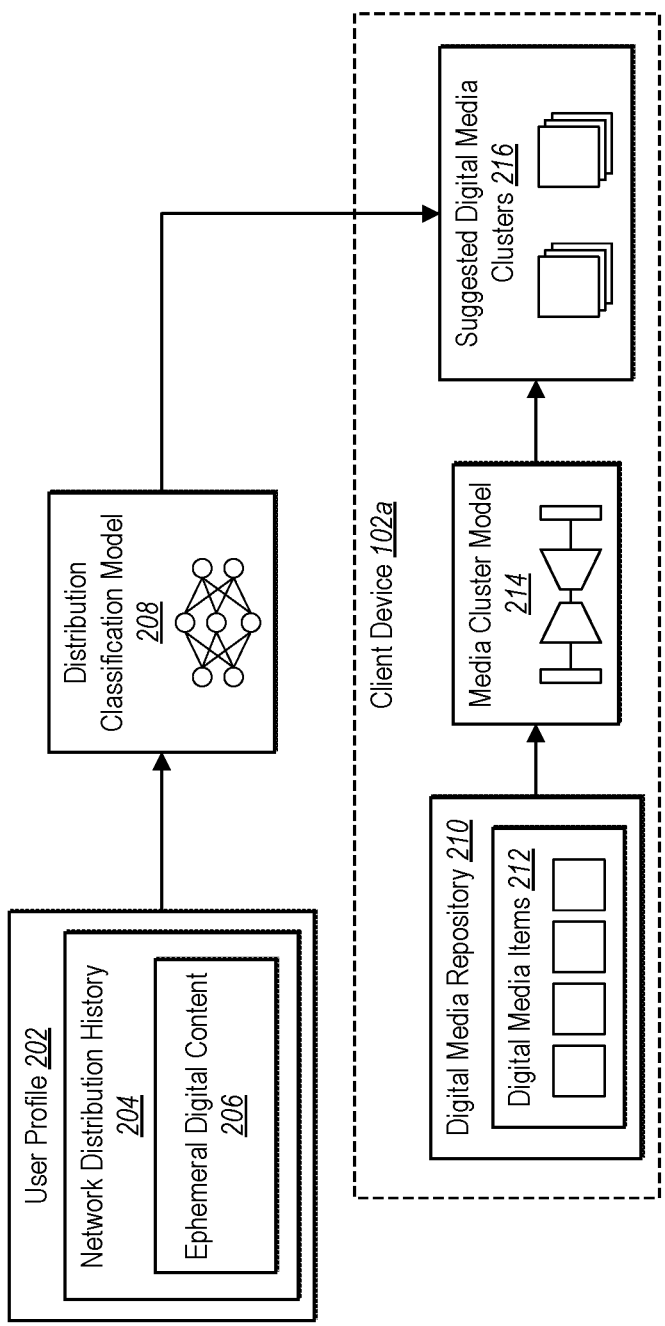
FIG. 2 illustrates a schematic diagram of generating suggested digital media clusters in accordance with one or more embodiments.

As mentioned above, the digital media clustering system 108 can generate suggested digital media clusters utilizing a distribution classification model and/or a media cluster model. In particular, FIG. 2 illustrates generating suggested digital media clusters in accordance with one or more embodiments. Specifically, FIG. 2 illustrates the digital media clustering system using a distribution classification model 208 to generate suggested digital media clusters 216 based on a network distribution history 204 corresponding to a user profile 202.

As shown in FIG. 2, the digital media clustering system accesses a user profile 202 comprising a network distribution history 204. Specifically, the user profile 202 includes details regarding a network account corresponding to the user (e.g., a user of the networking system 110). For instance, the network distribution history 204 indicates previous digital content distributed from the network account corresponding to the user via the networking system 110, such as social networking posts.

As illustrated in FIG. 2, the network distribution history 204 also includes ephemeral digital content 206 previously distributed via the networking system 110. For example, the ephemeral digital content 206 can include social networking posts or other electronic communications distributed by the user/user account that are automatically removed after a triggering event. Additional detail regarding ephemeral digital content is provided below (e.g., in relation to FIG. 4).

As shown in FIG. 2, the digital media clustering system 108 analyzes the network distribution history via the distribution classification model 208. The distribution classification model 208 can include one or more machine learning models (and/or heuristic models). For instance, the distribution classification model 208 can include a facial recognition model (to identify individuals portrayed in digital media from the network distribution history 204) and an object recognition model (to identify objects portrayed in digital media from the network distribution history 204). Furthermore, the distribution classification model 208 can include a classification model that identifies distribution classes based on the network distribution history. Additional detail regarding the distribution classification model 208 is provided below (e.g., in relation to FIGS. 3-6).

As mentioned above, the digital media clustering system 108 can analyze a digital media repository to suggest digital media clusters. Specifically, as shown in FIG. 2, the digital media clustering system 108 analyzes a digital media repository 210 at a client device 102a. The digital media repository 210 includes digital media items 212 (e.g., digital images and digital video captures by the client device 102a). The digital media clustering system 108 analyzes the digital media repository 210 utilizing a media cluster model 214.

The media cluster model 214 can include a variety of machine learning models (and/or heuristic models). For example, the media cluster model 214 can include a facial recognition model (to identify individuals portrayed in the digital media items 212) and an object recognition model (to identify objects portrayed in the digital media items 212). Moreover, the media cluster model 214 can include machine learning models for grouping digital media items. For example, the media cluster model 214 can generate digital media clusters based on common characteristics of the digital media items 212. Additional detail regarding the media cluster model 214 is provide below (e.g., in relation to FIGS. 3-6).

As shown in FIG. 2, the digital media clustering system 108 can generate suggested digital media clusters 216 based on the distribution classification model 208 and the media cluster model 214. For example, the digital media clustering system 108 can analyze digital media clusters generated by the media cluster model 214 in light of distribution classes generated by the distribution classification model 208 to generate the suggested digital media clusters 216.

In relation to FIG. 2, the digital media clustering system 108 analyzes the digital media repository 210 and surfaces the suggested digital media clusters 216 on the client device 102a. Thus, the digital media clustering system 108 can analyze the digital media repository 210, generate the suggested digital media clusters 216, and display the suggested digital media clusters 216 without transmitting information regarding the digital media repository 210 from the client device 102a. In some embodiments, with appropriate permission from a user, the digital media clustering system 108 can also analyze the digital media repository 210 at the remote server with the network distribution history 204 to generate suggested digital media items.

Figure 3:
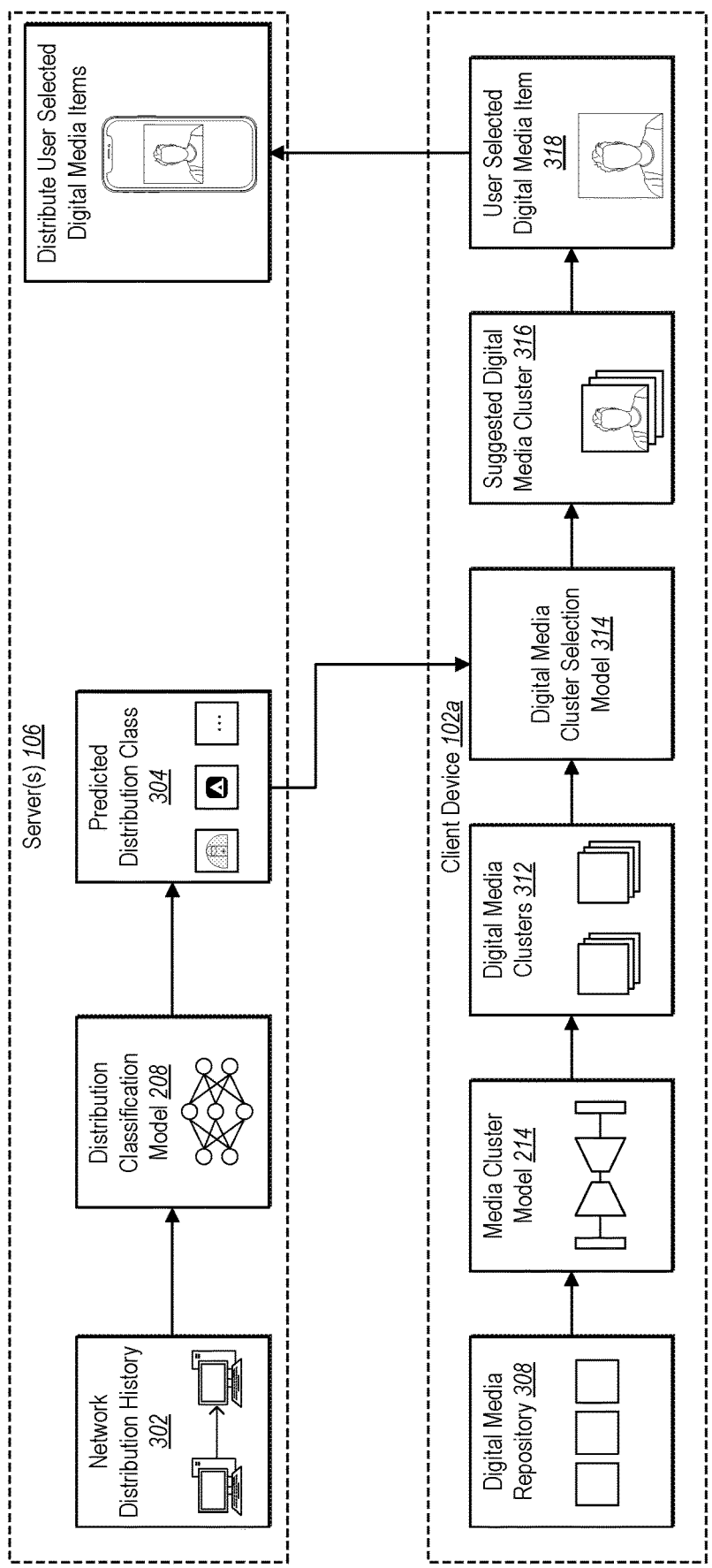
FIG. 3 illustrates a diagram of generating a suggested digital media cluster in accordance with one or more embodiments.

Turning now to FIG. 3, additional detail is provided regarding generating suggested digital media clusters and distributing digital media items in accordance with one or more embodiments. Specifically, FIG. 3 illustrates that the server(s) 106 store a network distribution history 302 and the client device 102(a) store a digital media repository 308. The digital media clustering system 108 utilizes the server(s) 106 to generate and transmit a predicted distribution class 304 to the client device 102a. The digital media clustering system 108 utilizes the client device 102a to analyze the digital media repository 308 and the predicted distribution class 208 to generate a suggested digital media clusters 316. Moreover, the digital media clustering system 108 utilizes the client device 102a and the server(s) 106 to distribute the user selected digital media item to other client devices (e.g., via the networking system 110).

As illustrated in FIG. 3, the digital media clustering system 108 utilizes the distribution classification model 208 to generate a predicted distribution class 304 (or a plurality of predicted distribution classes). The distribution classification model 208 can include a variety of individual machine learning models (and/or heuristic models). For example, in one or more embodiments, the distribution classification model 208 comprises a convolutional neural network. In particular, the distribution classification model 208 can include a convolutional neural network that comprises a plurality of neural network layers that analyze features of the network distribution history 302 at different levels of abstraction. For example, the distribution classification model 208 can include a plurality of interconnected convolutional layers, pooling layers, ReLu layers, and fully connected layers.

The digital media clustering system 108 can transform the network distribution history 302 into a form compatible with input to the distribution classification model 208. For example, the digital media clustering system 108 can generate an input feature vector that reflects network distribution history 302. For instance, the digital media clustering system 108 can convert digital media items, text, or other contents of previous electronic communications (e.g., social networking posts) to a feature vector. For example, the digital media clustering system 108 can generate feature vectors comprising R, G, B color channels of individual pixels from digital media. Similarly, the digital media clustering system 108 can generate vector representations of text such as a one-hot encoding of individual text characters. In some embodiments, the digital media clustering system 108 generates semantic vector representations that reflect semantic meaning of text. For instance, the digital media clustering system 108 can apply a word to vector algorithm that maps textual input to a semantic feature space, where the location within the semantic feature space reflects relative meaning of the text. The digital media clustering system 108 can also generate feature vectors reflecting historical distribution timing (e.g., frequency or times of historical distributions).

The distribution classification model 208 can analyze the input generated from the network distribution history 302 to generate the predicted distribution classes 304. Specifically, where the distribution classification model 208 comprises a convolutional neural network, individual layers can apply learned weights and parameters (learned through training iterations) to the input features to accurately determine predicted distribution classes that a user is likely to select in future electronic communications. Additional information regarding training the distribution classification model 208 is provided below (e.g., in relation to FIG. 6).

Although some of foregoing examples describe implementation of the distribution classification model 208 as a convolutional neural network, in some embodiments, the digital media clustering system 108 utilizes additional or alternative machine learning models. For example, in some embodiments, the digital media clustering system 108 implements the distribution classification model 208 as a recurrent neural network, such as a long-short-term memory neural network ("LSTM"). Specifically, the distribution classification model 208 can utilize a recurrent neural network that includes layers divided into sequential elements that analyze items in a sequential order. These sequential elements can analyze sequential input data together with feature vectors from previous sequential elements to generate predictions. In this manner, the distribution classification model 208 can consider sequential trends in data.

To illustrate, the distribution classification model 208 can analyze digital content distributed from network accounts over time as sequential inputs into a recurrent neural network. Each sequential element of the recurrent neural network can analyze individual distributions predict a distribution class and pass feature vectors regarding the timing and content of previous distributions to other sequential layers. In this manner, the distribution classification model 208 can learn to predict the distribution classes for network accounts over time based on the sequential timing and structure of previous distributions. For example, the distribution classification model 208 can learn that a network account posts in relation to an "outdoor" class on Saturdays but posts in relation to a "friend" class on Fridays. Similarly, the distribution classification model 208 can learn that a network account follows "friend" class posts with a "self-portrait" class post the next day.

In addition to recurrent neural networks, the digital media clustering system 108 can also utilize other machine learning models in implementing the distribution classification model 208. For example, the digital media clustering system 108 can utilize adversarial neural networks, decision trees, random forest algorithms, naïve bayes algorithms, and/or support vector machines in generating the predicted distribution class 304.

The distribution classification model 208 can also include other machine learning models to assist in generating predicted distribution classes. For example, the distribution classification model 208 can include facial recognition and/or object recognition models. To illustrate, the distribution classification model 208 can include a you-only-look-once ("YOLO") object detection model or another object classifier that identifies objects portrayed in digital media. Similarly, the distribution classification model 208 can include a facial recognition algorithm, such as DeepFace, which employs a nine-layer neural network to identify human faces portrayed in digital media.

In some embodiments, the distribution classification model 208 utilizes the objects and individuals identified in digital media from the network distribution history 302 to determine the predicted distribution class 304. For example, the digital media clustering system 108 can provide identified objects and individuals as input to a neural network (e.g., the convolutional neural network or recurrent neural network described above). The neural network then generates the predicted distribution class 304 based on the identified objects and individuals.

In some embodiments, the distribution classification model 208 can utilize heuristics (or pre-defined rules) to determine distribution classes. For example, the distribution classification model 208 can the predicted distribution class 304 by applying a heuristic to identified objects and/or individuals portrayed in digital media from the network distribution history 302. For example, upon identifying a threshold number of digital media portraying dogs, the distribution classification model 208 can determine a predicted distribution class of "dogs." Similarly, upon identifying a threshold number of digital media portraying mountains or water, the distribution classification model 208 can determine a predicted distribution class of "nature."

Similarly, the distribution classification model 208 can analyze text (e.g., hashtags, captions, or comments) to determine the predicted distribution class 304. For example, the distribution classification model 208 can identify from hashtags that a user repeatedly distributes content regarding trending challenges (e.g., #icebucketchallenge) or trips (e.g., #california). The distribution classification model 208 can determine the predicted distribution class 304 from this text (e.g., generate a "challenge" class or a "travel" class).

As illustrated by the foregoing example, the digital media clustering system 108 can utilize a variety of different classes for the predicted distribution class 304. In some embodiments, the digital media clustering system 108 generates the predicted distribution class 304 from a set of pre-defined classes. For example, the pre-defined classes can include an animal class (e.g., dog, cat, pet, or horse), an outdoor/nature class (e.g., mountain, lake, hiking, climbing), a sport classes (e.g., basketball, football, or golf), a food class, a challenge classes, a trip/travel class, a friend class, a holiday class, or a self-portrait class (e.g., a front-facing camera or "selfie" class). In some embodiments, the pre-defined classes include classes defined based on timing. For example, the digital media clustering system 108 can utilize a "photos on this day" class (e.g., for accounts that repeatedly post historical photos from the same day in previous years), and/or a "then and now class" (e.g., for accounts that post digital media portraying a location or people across different time periods), and/or any other distribution classes described herein. In some embodiments, a set of pre-defined distribution classes can include one or more mood or color classes. For example, the digital media clustering system 108 can determine that a network account distributes digital content with a particular mood or color (e.g., color profile).

As illustrated in FIG. 3, the distribution classification model 208 can analyze the network distribution history 302 and generate the predicted distribution class 304 (e.g., from a plurality of predicted distribution classes). In some embodiments, the distribution classification model 208 generates a relative ranking (e.g., a confidence score) for a set of distribution classes. For example, where the distribution classification model 208 comprises a convolutional neural network, the distribution classification model 208 can output a probability (e.g., a confidence score) for each possible distribution class. The distribution classification model 208 can also rank the possible distribution classes and select the predicted distribution class 304 based on the ranking (e.g., select the highest ranked distribution class or distribution classes that satisfy a confidence threshold). Although FIG. 3 illustrates a single predicted class 304, the digital media clustering system 108 can generate a plurality of predicted distribution classes. For example, in some embodiments, the digital media clustering system 108 provides a ranking of a plurality of distribution classes (e.g., with corresponding confidence scores).

As shown in FIG. 3, the digital media clustering system 108 can provide the predicted distribution class 304 (or a set of ranked predicted distribution classes) to the client device 102a. The client device 102a can analyze the predicted distribution class 304 together with the digital media repository 308 to generate a suggested digital media cluster 316 (or a plurality of suggested digital media clusters).

Specifically, as illustrated the digital media clustering system 108 analyzes the digital media repository 308 at the client device 102a utilizing the media cluster model 214. Similar to the distribution classification model 208, the media cluster model 214 can include a variety of machine learning models. For example, the media cluster model 214 can include a k-means clustering algorithm (or other clustering/grouping algorithm) that considers a variety of different input features and generates digital media clusters. For instance, the media cluster model 214 can include a k-means clustering algorithm that generates clusters based on time, individuals portrayed in digital media and/or objects portrayed in digital media.

The media cluster model 214 can also include a facial recognition algorithm and/or an object recognition algorithm (as described above). For example, the media cluster model 214 can utilize a facial recognition algorithm and/or an object recognition algorithm to generate features of media items in the digital media repository 308. The media cluster model 214 can then utilize a clustering algorithm to generate clusters based on the features. Thus, for example, the media cluster model 214 can generate digital media clusters that group common individuals portrayed in digital media (e.g., the same group of friends portrayed in digital images). The media cluster model 214 can generate digital media clusters that group common objects portrayed in digital media (e.g., group dogs portrayed in digital images). The media cluster model 214 can also generate media clusters based on time when a digital image was captured.

In other embodiments, the media cluster model 214 can include other machine learning models, such as the neural networks described above. For instance, in some embodiments, the media cluster model 214 can include a convolutional neural network that classifies digital media categories (in relation to a set of pre-defined categories). The media cluster model 214 then generates the clusters by grouping digital media based on the categories.

Similar to the acts described above in relation to the distribution classification model 208, the digital media clustering system 108 can generate input features from the digital media repository 308. To illustrate, the digital media clustering system 108 can generate color channels (e.g., R, G, B maps) reflecting the visual appearance of digital media items in the digital media repository 308. Moreover, the digital media clustering system 108 can encode capture time, capture location, or other metadata from the digital media (e.g., by generating a feature vector that includes time, date, and geographic coordinates). The digital media clustering system 108 can then provide this data as input to the media cluster model 214.

As mentioned above, the digital media clustering system 108 can also generate other features as input. For example, the digital media clustering system 108 can apply a facial recognition algorithm and/or object recognition algorithm to determine individuals, object, or locations portrayed in the digital media.

The media cluster model 214 can analyze the feature representations reflecting the digital media repository 308 and determine categories corresponding to each digital media item. For example, by applying learned weights and parameters for internal parameters of the convolutional neural network, the media cluster model 214 can determine that a first digital media item corresponds to an animal category, a second digital media item corresponds to a sports category, and a third digital media item corresponds to a trip category.

In some embodiments, the digital media clustering system 108 can determine that a single digital media item corresponds to multiple categories. For example, the digital media clustering system 108 can determine that a digital image portraying a group on a hike corresponds to both a "friend" category and an "outdoor" category. Indeed, the media cluster model 214 can generate confidence scores for a plurality of pre-defined categories and assign a media item based on the confidence scores (e.g., assign the media item to any category that satisfies a confidence threshold).

In addition to k-means clustering and convolutional neural networks, the digital media clustering system 108 can also utilize other machine learning models. For example, the digital media clustering system 108 can implement the media cluster model 214 as a generative neural network, a recurrent neural network, a random forest algorithm, a support vector machine, and/or another machine learning approach described herein.

Moreover, the media cluster model 214 can include one or more heuristic models to identify clusters. For example, the media cluster model 214 can identify a "trip" cluster by applying heuristics corresponding to number, time, and location of digital media items. To illustrate, the media cluster model 214 can identify an increased number or percentage of digital images over a time period in a particular location. In response, the media cluster model 214 can identify the digital images as a "trip" cluster.

Similarly, the media cluster model 214 can apply a heuristic regarding objects or individuals portrayed in a digital image to identify a cluster. For example, the media cluster model 214 can identify a set of digital images that portray an animal and include the set of digital images in an "animal" cluster. Similarly, the media cluster model 214 can identify a group of digital images with a large number of individuals and include the digital images in a "friend" cluster.

In some embodiments, the media cluster model 214 can infer relationships between individuals portrayed in digital media items. For example, the media cluster model 214 can identify friends and/or family relationships. To illustrate, in some embodiments, the client device 102a includes thumbnail images of "friends" (e.g., connected users that have shared permissions to access and/or share digital content) on the networking system 110. The media cluster model 214 can utilize a facial recognition algorithm to match the visual features from the thumbnail images with visual features of the digital media repository 308. The media cluster model 214 can then identify images that include these visual features (e.g., faces of friends) in a "friend" cluster. In this manner, the digital media clustering system 108 can identify a "friends" cluster without any sensitive identification information (e.g., name or ID) of any friends of the user.

As illustrated in FIG. 3, the digital media clustering system 108 utilizes the media cluster model 214 to generate the media item clusters 312 based on the digital media repository 308. The digital media clustering system 108 then utilizes a digital media cluster selection model 314 to generate a suggested digital media cluster 316 based on the predicted distribution class 304 and the media item clusters 312. Specifically, the digital media cluster selection model 314 aligns the media item clusters reflecting the digital media repository 308 (as generated at the client device 102a) with the predicted distribution class 304 reflecting the network distribution history 410 (as generated at the server(s) 106) to generate suggested digital media clusters. By utilizing both the predicted distribution class 304 and the media item clusters, the digital media cluster selection model 314 can generate the suggested digital media cluster 316 to accurately reflect digital media on the client device that a network account user is likely to distribute in future electronic communications.

As illustrated, the digital media cluster selection model 314 can compare the media item clusters 312 with the predicted distribution class 304 to generate the suggested digital media cluster 316. For example, as described above, the predicted distribution class 304 can include a "pet" class. Moreover, the media item clusters 312 can include a "pet" class, a "sport" cluster, and an "outdoor" class. The digital media cluster selection model 314 can determine a correspondence between the "pet" class and the "pet" cluster and select the pet clusters as the suggested digital media cluster 316.

As illustrated by the foregoing example, in some embodiments, the categories/clusters utilized by the media cluster model 214 directly match the distribution classes utilized by the distribution classification model 208. For example, the distribution classification model can utilize a pre-defined set of distribution classes that include an animal class, a sports class, and an outdoor class. Similarly, the media cluster model 214 can utilize digital media categories that include an animal category/cluster, a sports category/cluster, and an outdoor category/cluster.

In some embodiments, the categories/clusters utilized by the media cluster model 214 do not directly match the distribution classes utilized by the distribution classification model 208. Rather, the digital media clustering system 108 can utilize the digital media cluster selection model 314 to intelligently align the distribution classifications to the predicted distribution class 304. For example, the predicted distribution class can indicate that the network account at issue is a sports account. The media item clusters 312 generated by the media cluster model 214 can include a food cluster, an outdoor cluster, and an exercise cluster. The digital media cluster selection model 314 can utilize one or more heuristics that correlate distribution classes with digital media clusters. For example, the digital media cluster selection model 314 can include a heuristic that indicates that sports account correlate to outdoors and exercise. Accordingly, the digital media cluster selection model 314 can select the outdoors cluster and the exercise cluster as suggested digital media clusters.

The digital media clustering system 108 can also consider digital media quality and composition in generating suggested digital media items. For instance, in some embodiments, the digital media clustering system selects (e.g., filters) the digital media items based on quality (e.g., clarity or blurriness) and composition (e.g., arrangement of visual elements). To illustrate, in circumstances where a digital media repository includes a large number of similar digital images, the digital media clustering system 108 can filter the similar digital images based on quality and composition (e.g., a threshold number or a threshold quality/composition level). The digital media clustering system 108 can then suggest only the selected/unfiltered digital media items.

Moreover, as mentioned above, in some embodiments, the predicted distribution class 304 is provided to the client device 102a as a ranking of multiple predicted distribution classes (e.g., based on a confidence score of the individual distribution classes). The digital media cluster selection model 314 can utilize this ranking (e.g., the confidence scores) to generate the suggested digital media cluster 316. For example, consider a circumstance where the predicted distribution classes include the following rankings (and confidence scores): pet class (0.8), then and now class (0.75), and trip class (0.65). Moreover, the media item clusters include a food cluster, a trip cluster, an exercise cluster, and a then and now cluster. Based on the ranking and confidence scores of the distribution classes, the digital media cluster selection model 314 can utilize the pet cluster (i.e., the cluster corresponding to the highest ranked predicted distribution class) as the suggested digital media cluster 316.

Although FIG. 3 (and the foregoing example) indicate a single suggested digital media cluster 316, the digital media cluster selection model 314 can also generate a plurality of suggested digital media clusters. Indeed, the digital media clustering system 108 can generate a pre-defined number of suggested digital media clusters or a variable number of suggested digital media clusters (e.g., clusters that satisfy a confidence threshold). To illustrate, in the foregoing example with different rankings based on confidence scores, the digital media cluster selection model 314 can select clusters that satisfy a confidence threshold of 0.7. In such an example, the digital media cluster selection model 314 will select the "pet cluster" (confidence score of 0.8) and the "then and now" cluster (confidence score of 0.75) as the suggested digital media clusters.

Upon identifying the suggested digital media cluster 316, the digital media clustering system 108 can provide the suggested digital media cluster 316 for display. For example, the digital media clustering system 108 can provide the digital media cluster 316 for display in a user interface for selecting and distributing digital media items to distribute via the networking system 110. Additional detail regarding example user interfaces utilized by the digital media clustering system 108 is provided below (e.g., in relation to FIGS. 7-9C).

As illustrated in FIG. 3, the digital media clustering system 108 can identify a user selected digital media item 318. In particular, based on user interaction with a digital media selection user interface, the digital media clustering system 108 can identify one or more user selected digital media items from one or more suggested digital media clusters.

Moreover, as illustrated, the digital media clustering system 108 can transmit the user selected digital media item 318. In particular, the client device 102a can send the user selected digital media item 318 to the server(s) 106 and the server(s) 106 (via the networking system 110) can distribute the user selected digital media item 318 to other client devices (e.g., the client devices 102b, 102n). For instance, the server(s) can distribute the digital media item as part of an electronic communication to other users of the networking system 110.

Figure 4:
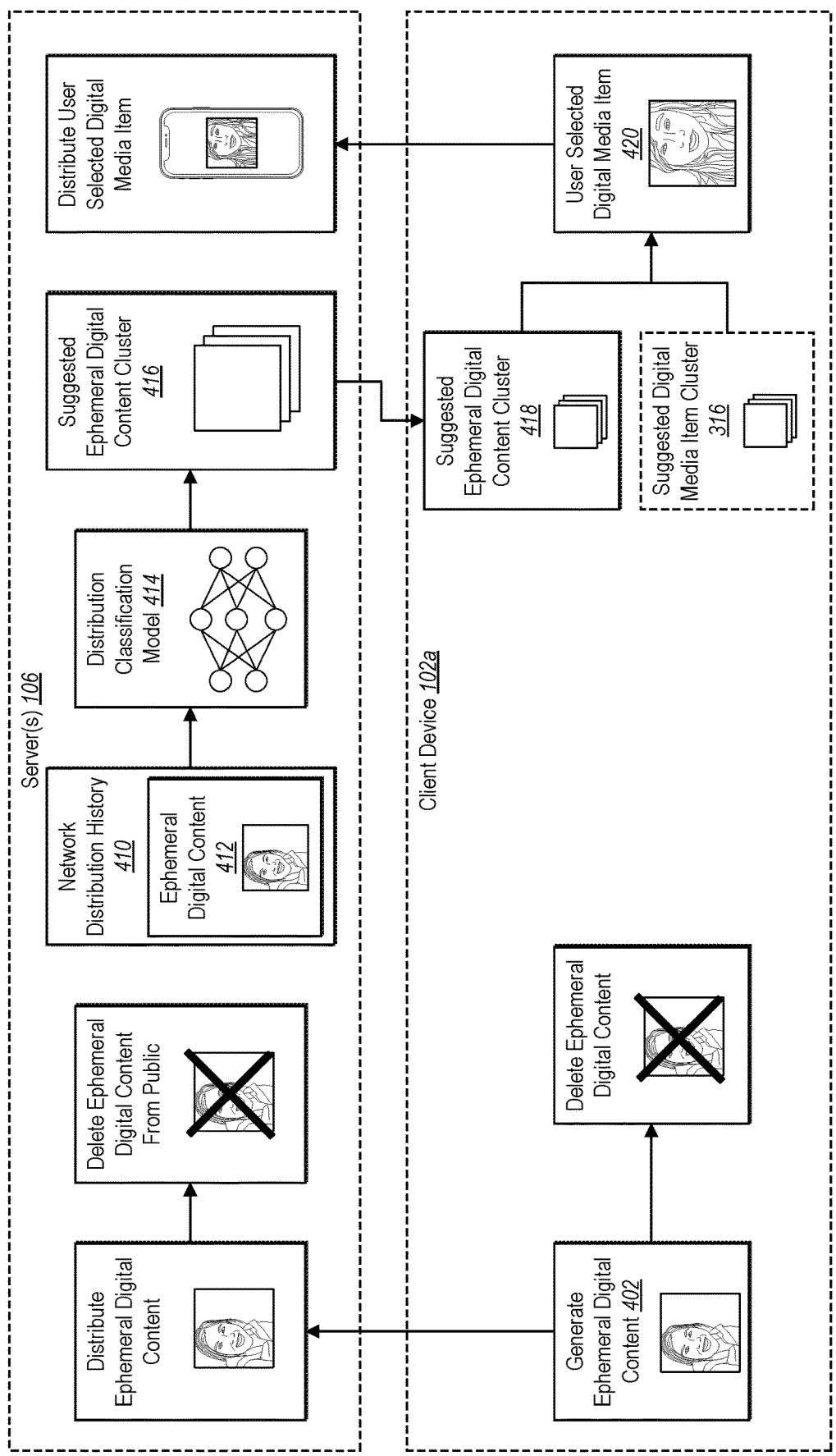
FIG. 4 illustrates a diagram of generating suggested ephemeral digital content in accordance with one or more embodiments.

As discussed above, the digital media clustering system 108 can also analyze and suggest ephemeral digital content items. FIG. 4 illustrates utilizing the server(s) 106 and the client device 102a to suggest ephemeral digital content items. For example, FIG. 4 illustrates the digital media clustering system 108 utilizing the server(s) 106 to analyze ephemeral digital content 402 generated on the client device 102a, generating a suggested ephemeral digital content cluster 416, and providing the suggested ephemeral digital content cluster 416 with other suggested digital media clusters (e.g., the suggested digital media cluster 316).

As shown in FIG. 4, the digital media clustering system 108 generates ephemeral digital content 402. For example, the digital media clustering system 108 (via the client device 102a) can capture a digital image or digital video and include the digital image or digital video as part of an ephemeral electronic message (e.g., an electronic message designated to be automatically deleted, removed, or hidden upon a triggering event).

As illustrated, the digital media clustering system 108 can transmit the ephemeral digital content 402 from the client device 102a to the server(s) 106. Moreover, the server(s) 106 (via the networking system 110) can distribute the ephemeral digital content 402 to other client devices. For example, the digital media clustering system 108 can post the ephemeral digital content 402 as a temporary story on a social networking system or transmit the ephemeral digital content as an instant message to other client devices.

The digital media clustering system 108 can also remove ephemeral digital content. For instance, as shown, the digital media clustering system 108 can delete, remove, or hide the ephemeral digital content (e.g., the ephemeral digital message) from the client device 102a. Moreover, the digital media clustering system 108 can delete, remove or hide the ephemeral digital content from other public sources (e.g., from other client devices or public servers). For example, the digital media clustering system 108 can automatically remove ephemeral digital content in response to one or more triggering events. For example, the digital media clustering system 108 can remove the ephemeral digital content from a recipient client device in response to detecting that the recipient client device has displayed the ephemeral digital content. Similarly, the digital media clustering system 108 can remove or hide ephemeral digital content based on a threshold period of time. For instance, the digital media clustering system 108 can post the ephemeral digital content (e.g., as an ephemeral story) for a threshold period of time as part of a social networking system and then remove the ephemeral digital content when the period of time has lapsed.

Although the digital media clustering system 108 can delete or remove digital content from one or more client devices (or other public facing resources), consistent with consumer privacy settings and retention preferences, the digital media clustering system 108 108 can also retain a copy of the ephemeral digital content (e.g., on the server(s) 106). For example, consistent with user privacy settings and retention preferences, the digital media clustering system 108 can retain previously distributed ephemeral digital content as part of the network distribution history 410 of a user/network account. Moreover, as shown in FIG. 4, the digital media clustering system 108 can analyze the ephemeral digital content 402 in suggesting ephemeral digital content to a client device of the user.

For instance, as illustrated in FIG. 4, the digital media clustering system 108 utilizes the server(s) 106 to analyze the network distribution history 410 of a user/network account that includes the ephemeral digital content 402. Specifically, the digital media clustering system 108 utilizes the distribution classification model 414 to analyze the network distribution history 410 and the ephemeral digital content 402 (along with other ephemeral digital content corresponding to the user/network account) to generate a suggested ephemeral digital content cluster 416 comprising one or more ephemeral digital content items. The distribution classification model 414 can utilize acts and algorithms described above (e.g., in relation to the distribution classification model 208 and the media cluster model 214) to generate the ephemeral digital content cluster 416.

In contrast to the digital media repository shown in FIG. 3 (which is stored on the client device 102a), the ephemeral digital content 402 has already been transmitted to the server(s) 106 in accordance with user instructions and privacy settings. Accordingly, the digital media clustering system 108 can analyze the ephemeral digital content 402 with other network distribution history 410 to select the suggested ephemeral digital content clusters 416 (i.e., rather than separating the analysis between the client device and the servers). In addition, the digital media clustering system 108 can also analyze other information stored on the server(s) 106, such as network accounts and network distribution history corresponding to a user's connections (e.g., friends) on the networking system 110.

In some embodiments, the server(s) 106 can provide the ephemeral digital content 402 to the client device 102a for analysis (e.g., for analysis as part of the digital media repository 308 as illustrated in FIG. 3). Thus, although FIG. 4 illustrates analysis of the ephemeral digital content 402 on the server(s) 106, in some embodiments, the digital media clustering system 108 analyzes the ephemeral digital content 402 and generates the suggested ephemeral digital content cluster 416 on the client device 102a.

In relation to the embodiment shown in FIG. 4, upon generating the suggested ephemeral digital content cluster 416, the digital media clustering system 108 provides the suggested ephemeral digital content cluster to the client device 102a. In turn, the digital media clustering system 108 utilizes the client device 102a to provide the ephemeral digital content cluster 416 for display. As illustrated in FIG. 4, the digital media clustering system 108 can provide the ephemeral digital content cluster 416 together with other suggested digital media. For example, the digital media clustering system 108 can provide the ephemeral digital content cluster 416 together with the suggested digital media cluster 316.

The digital media clustering system 108 can also distribute digital media based from the ephemeral digital content cluster and/or the suggested digital media cluster 316. For example, as shown in FIG. 4, the digital media clustering system 108 identifies a user selected digital media item 420. The user selected digital media item 420 can include digital ephemeral digital content 402 from the ephemeral digital content cluster 416 and/or a digital media item from the suggested digital media cluster 316. The digital media clustering system 108 (via the client device 102a) provides the user selected digital media item 420 to the server(s) 106 and distributes the user selected digital media item 420 to other client devices in accordance with user instructions.

Figure 5:
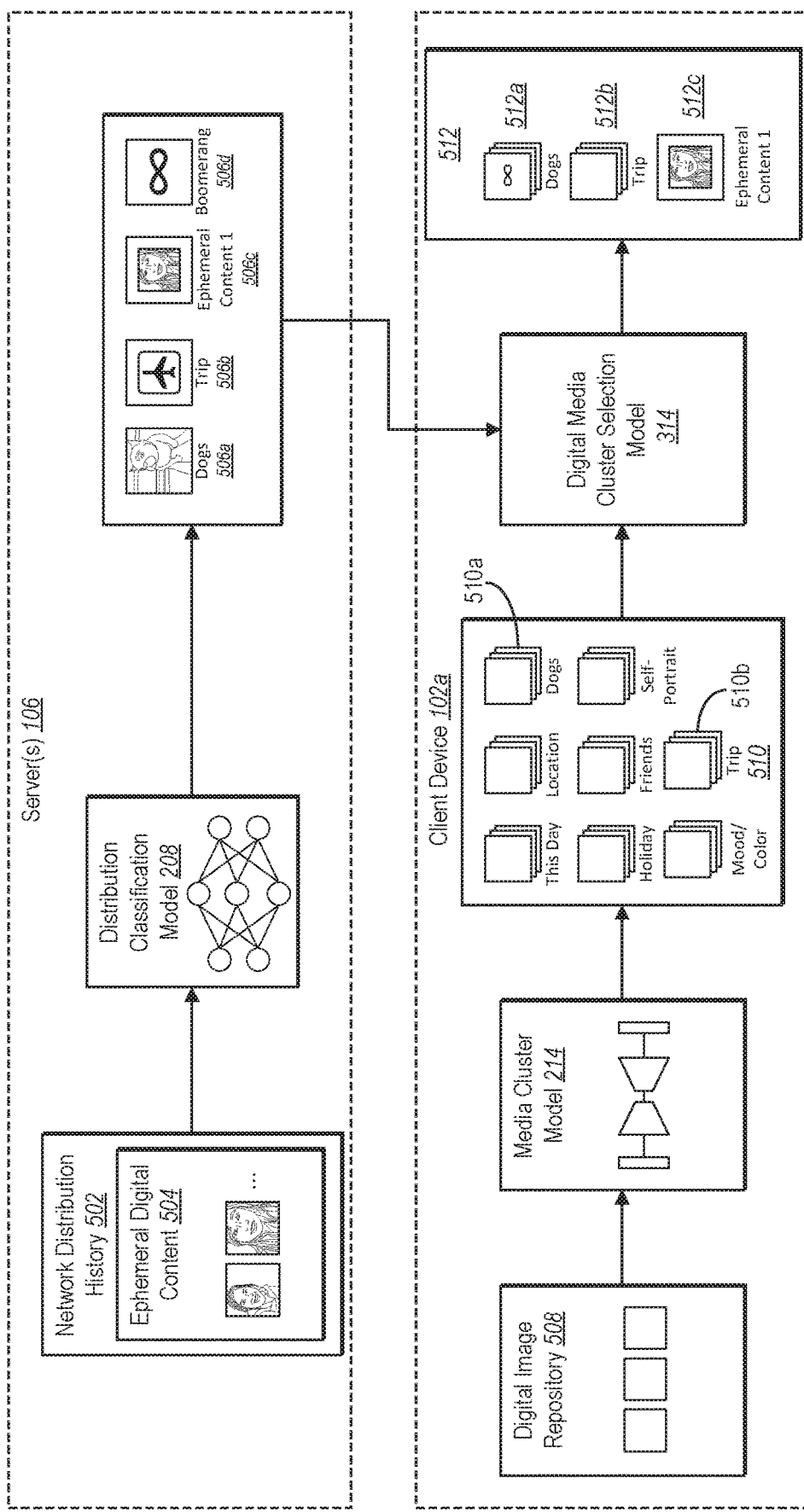
FIG. 5 illustrates a diagram of providing suggested ephemeral digital content other suggested digital media items for display in accordance with one or more embodiments.

As mentioned above, the digital media clustering system 108 can generate both distribution classes and suggested ephemeral digital content at the server(s) 106 based on network distribution history. Moreover, the digital media clustering system 108 can also determine suggested digital media style modifications based on network distribution history. FIG. 5 illustrates an example embodiment that generates distribution classes, suggested ephemeral digital content, and style modifications (at the server(s) 106) in order to generate suggested digital media clusters (at the client device 102a).

Specifically, in relation to FIG. 5 the digital media clustering system 108 utilizes the distribution classification model 208 to analyze network distribution history 502 that includes ephemeral digital content 504. As described in relation to FIGS. 3 and 4, the distribution classification model 208 generates a distribution classes 506a-506b (i.e., "dogs" and "trip") and an ephemeral digital content item 506c (i.e., "ephemeral content 1").

In addition, the digital media clustering system 108 generates a suggested digital media style modification 506d based on the network distribution history 502. Specifically, the suggested digital media style modification 506d (i.e., "Boomerang") includes modifying a digital media item to a brief video representation that repeatedly loops forward and backwards. The digital media clustering system 108 determines the suggested style modification based on analyzing the network distribution history and identifying previous digital media items distributed via the networking system 110 that include the suggested digital media style modification 506d.

The digital media clustering system 108 can monitor and track a variety of suggested style modifications. For example, the digital media clustering system 108 can monitor application of various filters; quality corrections; or changes to color, style, quality (e.g., fix blurry eyes or fuzzy regions), hue, or texture in digital media items distributed via the networking system 110. The digital media clustering system 108 can include these modifications in the network distribution history 502. Utilizing similar approaches described above (in relation to FIGS. 3, 4) the distribution classification model 208 can analyze the network distribution history and generate a suggested style modification. For example, the distribution classification model 208 can utilize an LSTM neural network to predict one or more style modifications that a user is likely to apply to a digital media item in a future electronic communication.

As shown in FIG. 5, the digital media clustering system 108 also utilizes a media cluster model 214 (at the client device 102a) to generate a plurality of digital media clusters 510. The digital media clusters 510 include a "this day" cluster (comprising digital media items from this day in previous time periods), a "location" cluster (comprising digital media items from a particular location), a "dogs" cluster (comprising digital media items portraying dogs), a "holiday" cluster (comprising digital media items of a holiday), a "friends" cluster (comprising digital media items of friends of a user), a "self-portrait" cluster (comprising selfies), a "mood"/"color" cluster (comprising digital images with a common color scheme), and a "trip" cluster (comprising digital images of a recent trip).

The digital media clustering system 108 analyzes the digital media clusters 510 together with the distribution classes 506a-506b, the ephemeral digital content item 506c, and/or the suggested digital media style modification 506d. As shown, the digital media cluster selection model 314 generates suggested digital media clusters 512a-512c. Specifically, the digital media cluster selection model 314 compares the distribution classes 506a-506b with the digital media clusters 510 and identifies a correspondence between the distribution class 506a ("dogs" class) and the digital media cluster 510a ("dogs" cluster). Moreover, the digital media cluster selection model 314 also identifies a correspondence between the distribution class 506b ("trip" class) and the digital media cluster 510b ("trip" cluster). In response, the digital media clustering system 108 utilizes the digital media clusters 510a, 510b to generate the suggested digital media clusters 512a, 512b.

As shown, however, the digital media clustering system 108 can modify the digital media clusters identified by the media cluster model 214 in generating the suggested digital media clusters 512. For example, based on the suggested digital media style modification 506d, the digital media clustering system 108 modifies the digital media cluster 510a to generate the suggested digital media style 506d. Specifically, the digital media clustering system 108 modifies one or more digital media items in the digital media cluster 510a and transforms the one or more digital media items utilizing the suggested digital modification (e.g., such that the digital media items are now "Boomerangs" that play forward and backward repeatedly).

Although FIG. 5 illustrates generating a particular digital modification, the digital media clustering system 108 can apply any suggested digital modification to a digital media item. For example, the digital media clustering system 108 can apply a variety of filters or corrections identified based on the network distribution history 502.

Moreover, although FIGS. 3-5 illustrate generating suggested digital media clusters for a particular network account and a particular client device of a user, the digital media clustering system 108 can generate suggested digital media clusters for multiple network accounts corresponding to a user and multiple client devices of a user. For example, the digital media clustering system 108 can analyze a second network distribution history for a second network account of a user to generate a second set of distribution classes. The digital media clustering system 108 can compare the second set of distribution classes with digital media clusters at the client device and generate a second set of suggested digital media clusters (specific to the second network account).

Similarly, a user can utilize a second client device (with an additional repository of digital media items) and the digital media clustering system 108 can generate an additional set of suggested digital media clusters. For example, digital media clustering system 108 can analyze the additional repository of digital media items to generate an additional set of digital media clusters. The digital media clustering system 108 can analyze the set of digital media clusters with the distribution classes (e.g., the predicted distribution class 304) to generate an additional set of suggested digital media clusters. Similarly, the digital media clustering system 108 can generate further suggested media clusters as a digital media repository changes (or based on a second digital media repository). Accordingly, the digital media clustering system 108 can generate unique suggested digital media clusters for different users, different network accounts, different client devices, and/or different digital media repositories.

In some circumstances, a user may not wish to see one or more suggested digital media items. For example, if a suggested digital media item portrays a lost pet, the user may not wish to see the digital media item in future suggestions. In some embodiments, the digital media clustering system 108 provides user feedback controls to remove digital media items or types of digital media items. Upon receiving user interaction via the user feedback controls, the digital media clustering system 108 can remove the digital media items and similar digital media items from future suggestions.

To reduce the time and computation power to generate suggested digital media items, the digital media clustering system 108 can limit its analysis to particular digital media items. For example, after generating digital media clusters, the digital media clustering system 108 can limit its analysis to new digital content (e.g., add new digital content to clusters previously generated by the digital media clustering system 108 rather than re-analyzing the entire digital content repository). Similarly, the digital media clustering system 108 can generate suggested digital media items in advance (e.g., behind the scenes) prior to a user accessing digital content to transmit to other client devices. For example, upon initiating a networking system application at the client device, the digital media clustering system 108 can analyze a repository of digital media items and generate suggested media items. The digital media clustering system 108 108 can then surface the suggested media items at a later time (e.g., when the user accesses a camera roll).

Figure 6:
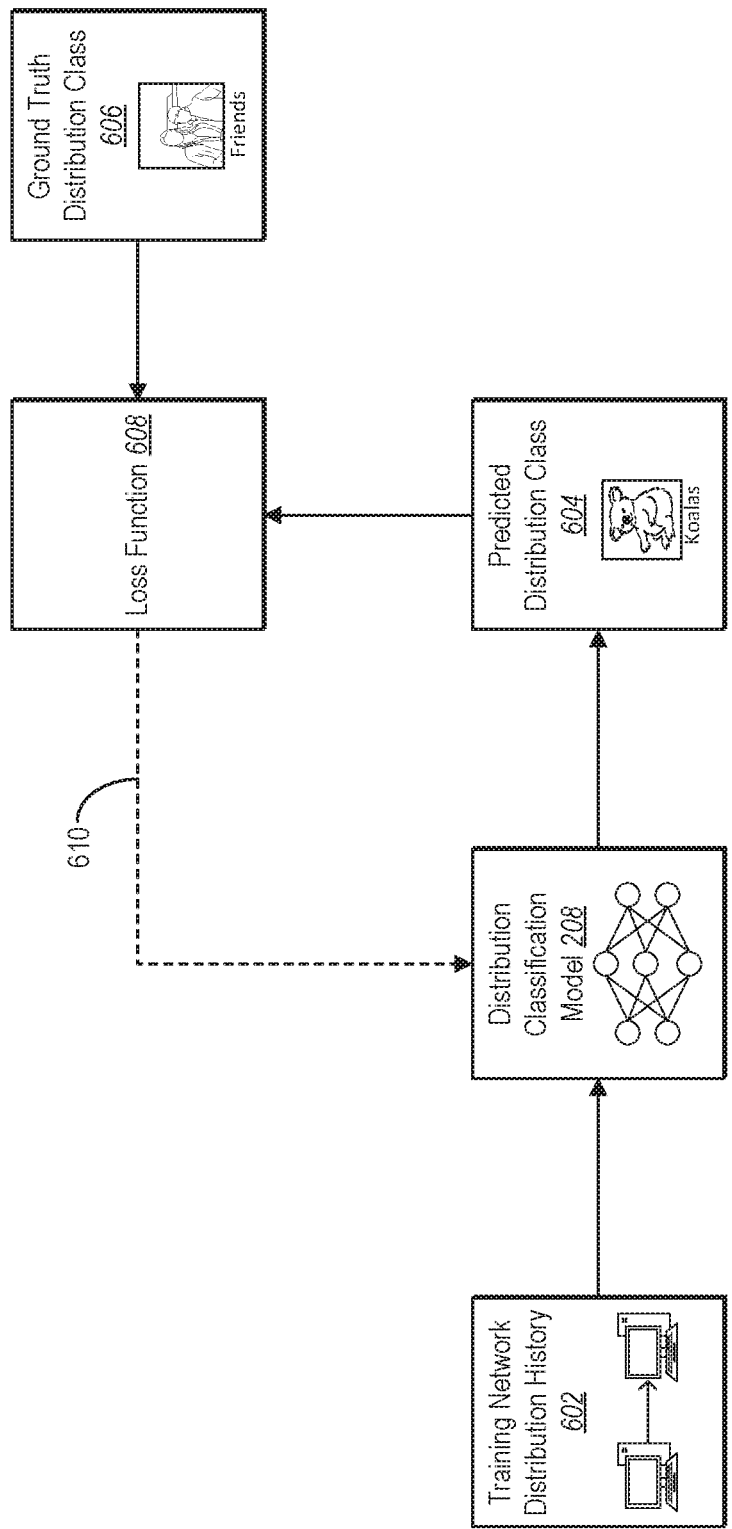
FIG. 6 illustrates training a distribution classification model to generated predicted distribution classes in accordance with one or more embodiments.

As discussed above, the digital media clustering system 108 can train a distribution classification model to generate predicted distribution classes. FIG. 6 illustrates training the distribution classification model 208 in accordance with one or more embodiments. Specifically, FIG. 6 illustrates training the distribution classification model 208 based on a training network distribution history 602 and a ground truth distribution class 606.

The digital media clustering system 108 can identify or generate the training network distribution history 602. For example, the digital media clustering system 108 can monitor user interactions with the networking system 110 to identify and/or generate the training network distribution history 602. To illustrate, the digital media clustering system 108 can identify previous posts or electronic communications provided via a network account of the networking system 110.

As illustrated in FIG. 2, the digital media clustering system 108 analyzes the training network distribution history 602 using the distribution classification model 208 to generate a predicted distribution class 604. For example, the digital media clustering system 108 can analyze the training network distribution history 602 of a network account and predict a distribution class indicating an "dog account" indicating a future post will likely include a digital media item that portrays a dog.

The digital media clustering system 108 can access a ground truth distribution class 606. The ground truth distribution class 606 includes observed data indicating an actual distribution class corresponding to the user account. For example, the ground truth distribution class 606 can include an observed social media post or electronic communication comprising a digital media item that a training account actually distributed after the training network distribution history 602. For instance, the ground truth distribution class 606 can include a social media post of an outdoor picture. Similarly, the ground truth distribution class 606 can include a label (e.g., user label) identifying a network account as corresponding to a particular class (e.g., a user selection that a particular account is a "travel log" account). Moreover, the ground truth distribution class 606 can include negative or positive user input as a ground truth indicator (e.g., user interaction via a user feedback control indicating that a suggested digital media item is not desired could be used as a negative ground truth data point).

As shown, the digital media clustering system 108 can train the distribution classification model 208 by comparing the predicted distribution class 604 and the ground truth distribution class 606. Specifically, the digital media clustering system 108 can utilizes a loss function 608 to compare the predicted distribution class 604 and the ground truth distribution class 606 and determine a measure of loss (e.g., a difference between the predicted and actual). Based on the measure of loss, the digital media clustering system 108 can modify (as indicated by the arrow 610) internal parameters of the distribution classification model 208. To illustrate the digital media clustering system 108 can back-propagate the measure of loss through layers of a neural network to modify parameters and weights and reduce the measure of loss between the predicted distribution class 604 and the ground truth distribution class 606.

For example, for a predicted distribution class 604 of "animal" and a ground truth distribution class of "outdoor" the digital media clustering system 108 can determine a difference (e.g., a measure of loss). The digital media clustering system 108 can then modify internal parameters of the distribution classification model 208 to reduce the measure of loss and more accurately predict distribution classes. The digital media clustering system 108 can repeatedly perform the process illustrated in FIG. 6 (e.g., repeatedly generate predicted distribution classes and compare the predicted distribution classes to ground truth distribution classes) to train the distribution classification model 208.

The digital media clustering system 108 can perform a similar training process with regard to the media cluster model 214. For example, the digital media clustering system 108 can analyze training digital media repositories with the media cluster model 214. The media cluster model 214 can predict one or more media clusters and the digital media clustering system 108 can compare the predicted media clusters with ground truth media clusters (e.g., media clusters identified, approved, or generated by a user). The digital media clustering system 108 can train the media cluster model 214 by similarly comparing the ground truth clusters with the predicted clusters.

This training approach applies to a variety of machine learning models discussed above. For example, the digital media clustering system 108 can train a convolutional neural network or an LSTM neural network utilizing the approach described in FIG. 6.

Figure 7:
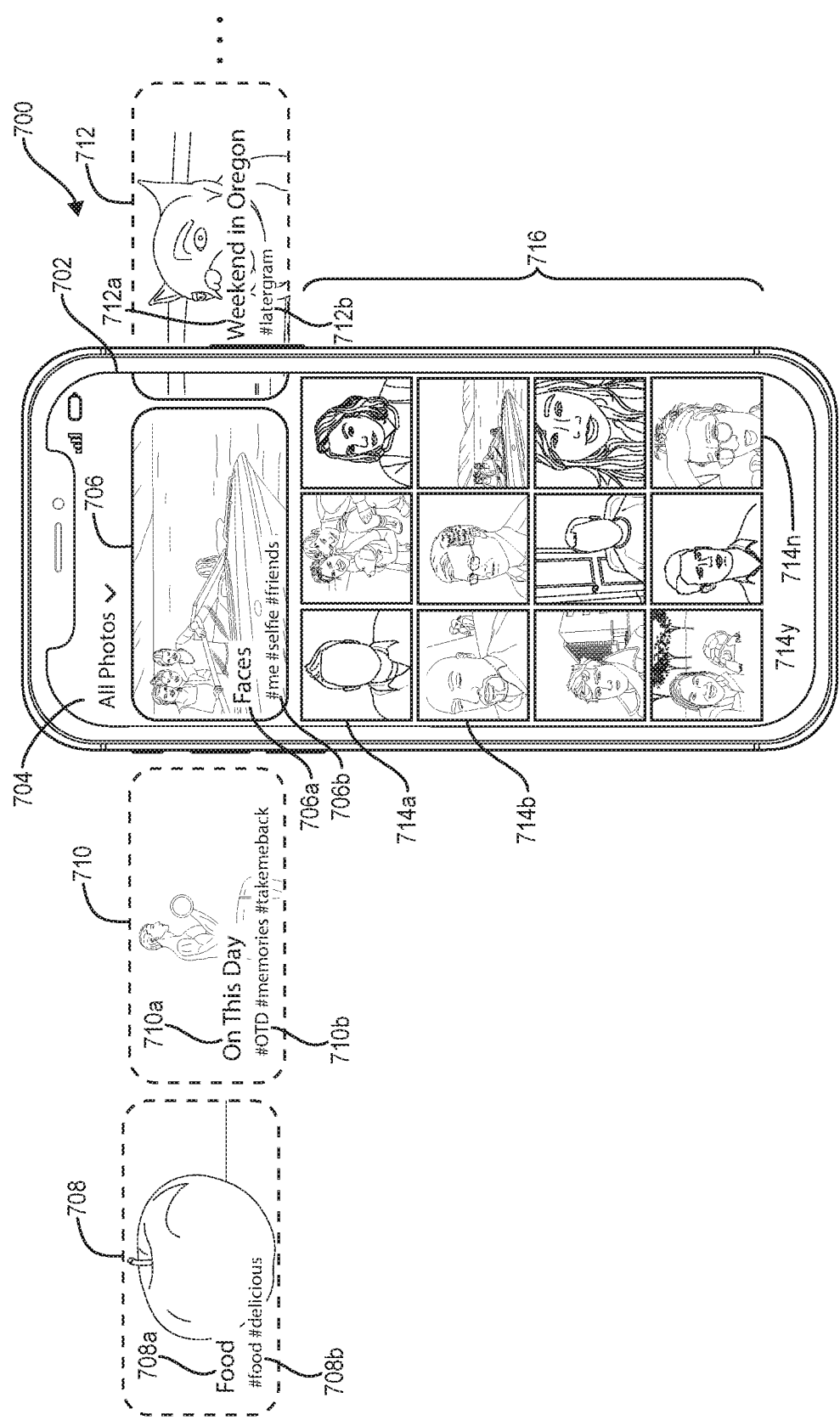
FIG. 7 illustrates a computing device having a user interface portraying digital media clusters and digital media items in accordance with one or more embodiments.

As discussed above, the digital media clustering system 108 can generate one or more user interfaces for displaying suggested digital media items. For example, FIG. 7 illustrates a computing device 700 with a display 702 comprising a user interface 704 in accordance with one or more embodiments. The user interface 704 includes a cluster representative image 706 (i.e., a representative card) together with a digital media display area 716 that includes a plurality of digital media items.

The cluster representative image 706 corresponds to a suggested digital media cluster generated by the digital media clustering system 108. For example, the cluster representative image 706 represents a "faces" cluster. Based on user interaction with the user interface 704, the digital media clustering system 108 can display different cluster representative images corresponding to a variety of suggested digital media clusters. For example, in response to a swiping gesture, the digital media clustering system 108 can display a second cluster representative image 712 in the user interface 704. Similarly, in response to a swiping gesture in the opposite direction, the digital media clustering system 108 can display a third cluster representative image 710 and/or a fourth cluster representative image 708.

Each cluster representative image 706-712 portrays a digital image from the corresponding suggested digital media cluster. The digital media clustering system 108 generates the suggested digital media clusters as described above (e.g., in relation to FIGS. 2-5). Specifically, the digital media clustering system 108 analyzes a digital media repository on the computing device 700 and distribution classes reflecting network distribution history to determine a plurality of suggested digital media clusters. The digital media clustering system 108 then provides the suggested digital media clusters for display as the cluster representative images 706-712.

The digital media clustering system 108 selects the cluster representative image 706 from digital media items within the corresponding digital media cluster. The digital media clustering system 108 can select a representative image utilizing a variety of approaches. In some embodiments, the digital media clustering system 108 selects a highest quality digital image (e.g., based on quality or composition) as the cluster representative image. In one or more embodiments, the digital media clustering system 108 selects the cluster representative image based on confidence score (e.g., the digital media item with the highest confidence score from the media cluster model 214). In some embodiments, the cluster representative image 706 changes over time. For example, the digital media clustering system 108 can cycle through the digital media items in the corresponding digital media cluster and sequentially display each of the digital media items over time.

In relation to FIG. 7 each of the cluster representative images 706-712 are also selectable user interface elements. Indeed, based on user interaction with the cluster representative images 706-712 the digital media clustering system 108 can display the digital media items from the corresponding digital media cluster in the user interface 704. Indeed, FIG. 7 illustrates digital media items 714a-714n within the digital media display area 716 of the user interface 704 upon selection of the cluster representative image 706.

Each of the cluster representative images 706-712 also include text information. Specifically, the cluster representative images 706-712 include a text description and one or more hashtags pertinent to the corresponding digital media cluster. For example, the cluster representative image 706 includes a text description 706a ("Faces") and hashtags 706b (#me, #selfie, and #takemeback). The digital media clustering system 108 can determine this text information based on a variety of factors.

For example, the digital media clustering system 108 can determine the text description 706a from the corresponding cluster. For instance, the digital media clustering system 108 can determine the text description "Faces" from a title or descriptor of the cluster (or a tile or descriptor of a distribution class corresponding to the cluster). Similarly, the digital media clustering system 108 can determine the text description 706a based on objects identified in digital media (or time or capture location of the digital media). For example, for particular moment or trip clusters, the digital media clustering system 108 can include text indicating the location where the digital media was captured and a date (e.g., a date range of a trip). In this manner, the digital media clustering system 108 generates the text descriptions 706a-712a.

In addition, the digital media clustering system 108 can determine the hashtags 706b from pre-defined hashtags or hashtags corresponding to previously distributed digital content. For example, the digital media clustering system 108 can utilized pre-defined, user-generated hashtags that map to particular clusters or categories. In some embodiments, the digital media clustering system 108 determines hashtags from hashtags applied to previous social networking posts. For example, the system identifies a threshold number of a particular hashtag in relation to a particular distribution class (e.g., from a plurality of network accounts), the digital media clustering system 108 can utilize the hashtag in a cluster representative image selected based on the distribution class. In some embodiments, the digital media clustering system 108 can generate hashtags based on the particular environment or circumstances of the client device. For example, upon detecting that the current day is a Thursday, the digital media clustering system 108 can utilize a hashtag of "Throwback Thursday" for a cluster. In this manner, the digital media clustering system 108 generates the hashtags 706b-712b.

As mentioned above, the digital media clustering system 108 can provide suggested digital media clusters together with suggested ephemeral digital content. FIGS. 8A-8B illustrate a user interface for displaying suggested digital media clusters and suggested ephemeral digital content in accordance with one or more embodiments. Specifically, FIG. 8A illustrates a computing device 800 with a display 802 illustrating a user interface 804. The user interface 804 includes a cluster representative image 806 and a plurality of digital media items 808 from a digital media cluster corresponding to the cluster representative image 806 (e.g., "Faces").

The user interface 804 includes a first selectable element 810 (labeled "Photos) and a second selectable element 812 (labeled "Stories"). Based on user interaction with the first selectable element 810, the digital media clustering system 108 provides one or more suggested digital media clusters for display. Based on user interaction with the second selectable element 812 the digital media clustering system 108 provides one or more suggested ephemeral digital content items for display. The digital media clustering system 108 can also transition between digital media clusters and ephemeral digital content items based on alternative user interactions (e.g., a left swipe or right swipe on the user interface 804).

For example, FIG. 8B illustrates the user interface 804 upon selection of the second selectable element 812 (or a left swipe gesture). As shown in FIG. 8b, the user interface 804 now includes an ephemeral digital content representative image 814. The user interface 804 also includes a plurality of ephemeral digital content items 816a-816n in an ephemeral digital content area 818.

Utilizing the user interface 804, the digital media clustering system 108 can thus present a variety of suggested digital media items. Moreover, the digital media clustering system 108 can allow a user to scroll through and review suggested digital media items. For example, the digital media clustering system 108 can provide an interactive timeline scroll element (to skip to digital media items at a particular date or time). Based on user interaction with a digital media item (e.g., a force touch or long select gesture), the digital media clustering system 108 can also provide an enlarged digital image for review.

As mentioned above, the digital media clustering system 108 can also generate user interfaces for selecting and distributing digital content via a networking system. For example, FIG. 9A show a client device 900 that includes a display 902 illustrating a user interface 904 that includes a cluster representative image 906 and a plurality of digital media items 908a-808n. As illustrated, based on user interaction with the digital media item 908n, the digital media clustering system 108 provides an indication that the digital media item 908n has been selected by the user (e.g., selected for distribution).

Figure 9B:
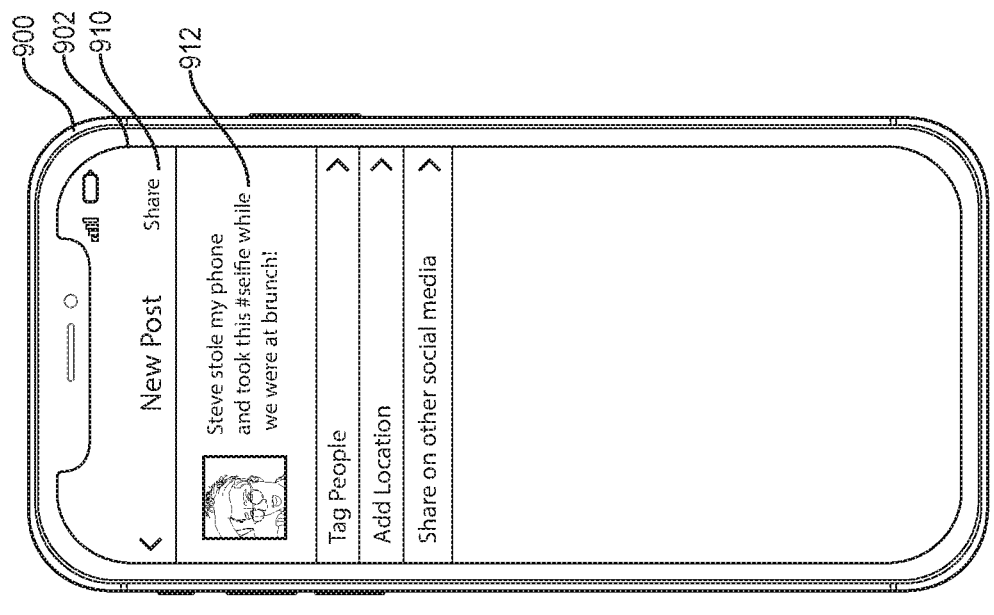
FIGS. 9A-9C illustrate a computing device having user interfaces for selecting digital media items, drafting electronic messages, and distributing digital media items and electronic messages in accordance with one or more embodiments.
Figure 9A:
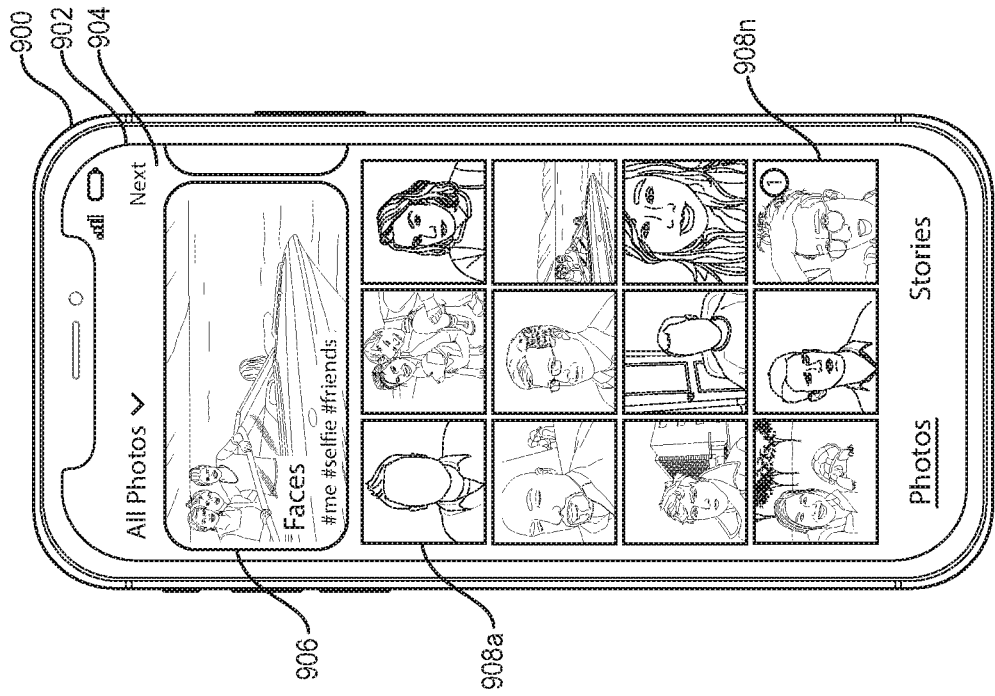

As shown in FIG. 9B, upon selection of the "Next" user interface element, the digital media clustering system 108 also generates the user interface 910. The user interface 910 includes a text entry area for user input of text 912 to include as part of a digital message. The user interface 910 also includes elements for tagging (e.g., flagging and notifying) other users, adding a location identified in the digital message, and sharing the digital message via a variety of social networking systems.

After identifying an indication of a desire to share the digital communication (e.g., user selection of the "share" user interface element), the digital media clustering system 108 distributes the selected digital media item. For example, the digital media clustering system 108 can generate a social media post and provide the social networking post for display. In particular, FIG. 9 illustrates the digital media clustering system 108 generating and providing a user interface 914 displaying a social media post 920 (e.g., as part of a social networking feed for a network account of a user). As shown the social networking post includes the digital media item 908n and the text 912.

Figure 9C:
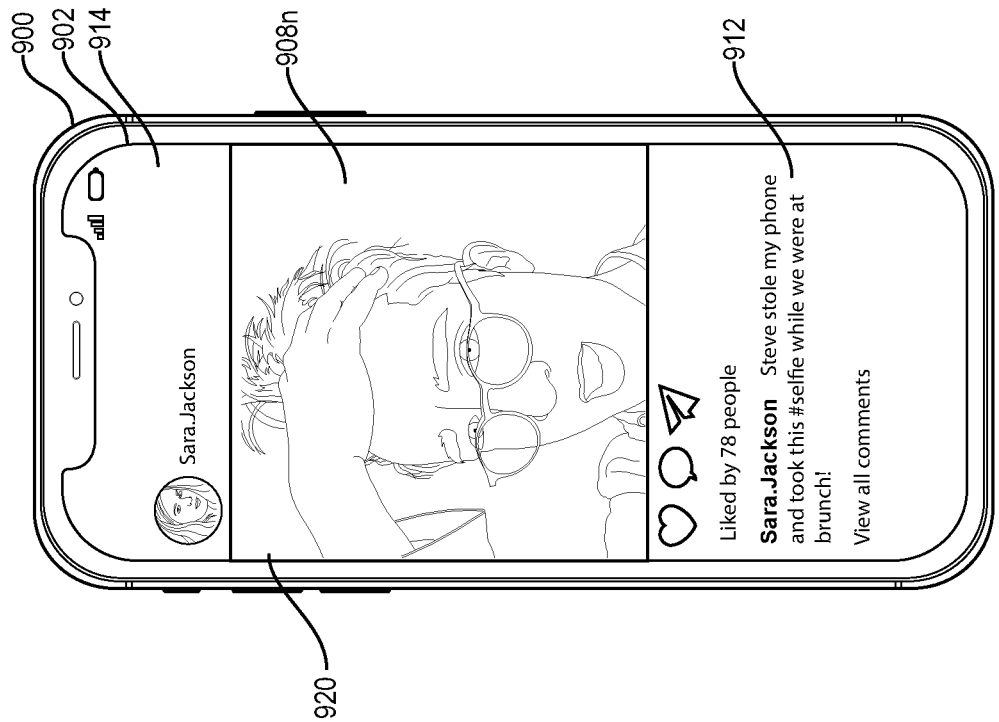

Although FIG. 9C illustrates distributing digital content in relation to a social networking post, it will be appreciated that the digital media clustering system 108 can distribute digital content in a variety of alternative ways. For example, the digital media clustering system 108 can also distribute electronic communications comprising digital media via a private message to another client device (e.g., via an instant message through the networking system 110). Similarly, the digital media clustering system 108 can distribute digital media as an ephemeral electronic communication.

Figure 10:
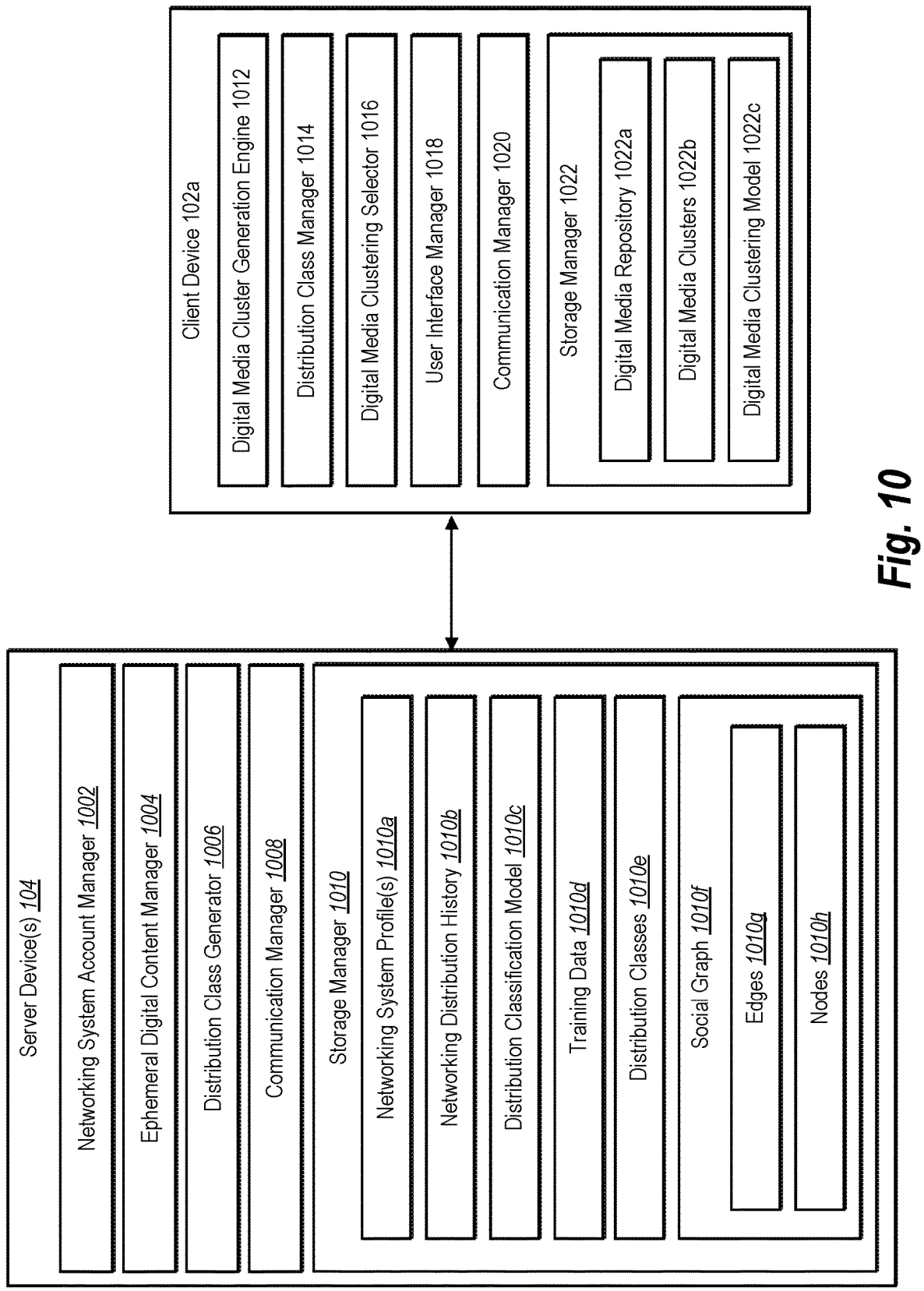
FIG. 10 illustrates a block diagram of the digital media clustering system in accordance with one or more embodiments.

Turning now to FIG. 10, additional detail is provided regarding components and capabilities of the digital media clustering system 108 in accordance with one or more embodiments. As shown, the digital media clustering system 108 is implemented by the server(s) 106 and the client device 102a. In other embodiments, the components of the digital media clustering system 108 can be implemented by a single device (e.g., the server(s) 106 or the client device 102a) or other devices not shown (e.g., the client devices 102b, 102n).

As shown in relation to FIG. 10, the server(s) 106 include a networking system account manager 1002, an ephemeral digital content manager 1004, a distribution class generator 1006, a communication manager 1008, and a storage manager 1010 (that includes networking system profile(s) 1010a, network distribution history 1010b, distribution classification model 1010c, training data 1010d, distribution classes 1010e, and social graph 1010f that includes edges 1010g and nodes 1010h). Moreover, as shown, the client device 102a includes a digital media clustering generation engine 1012, a distribution class manager 1014, a user interface manager 1018, a communication manager 1020, and a storage manager 1022 (that includes digital media repository 1022a, digital media clusters 1022b, and digital media cluster model 1022c). Additional detail regarding each of the components 1002-1022c will be provided in turn.

The networking system account manager 1002 can identify, generate, monitor, and/or manage network accounts. For example, the network system can generate one or more network accounts for a user and generate information (in accordance with privacy permissions) regarding the network account. For example, the networking system account manager 1002 can identify other users with permissions to view digital content from the network account or share digital content to the network account (e.g., friends). The networking system account manager 1002 can also monitor digital content distributed by network accounts to generate network distribution history.

The ephemeral digital content manager 1004 can identify, generate, create, post, distribute, remove, hide, delete, and/ or monitor ephemeral digital content. As discussed above, the ephemeral digital content manager 1004 can share ephemeral digital content, remove digital content from one or more client devices, record the ephemeral digital content, and/or transmit the ephemeral digital content.

The distribution class generator 1006 can create, determine, identify, and/or generate one or more distribution classes. As described above, the distribution class generator 1006 can analyze network distribution history to generate one or more distribution classes corresponding to a network account. The communication manager 1008 can manage digital communications to or from the server(s) 106. For example, the communication manager 1008 can transmit distribution classes to the client device 102a. Similarly, the communication manager 1008 can receive digital content from the client device 102a and distribute the digital content to other client devices.

The storage manager 1010 maintains data for the digital media clustering system 108 at the server(s) 106. The storage manager 1010 can maintain data of any type, size, or kind, as necessary to perform the functions of the digital media clustering system 108, including networking system profile(s) 1010a, network distribution history 1010b, distribution classification model 1010c (e.g., a convolutional neural network or other machine learning model described above), training data 1010d (e.g., training network distribution history or other training data utilized to train machine learning models), distribution classes 1010e, and social graph 1010f that includes edges 1010g and nodes 1010h (additional detail regarding the social graph 1010f, edges 1010g, and nodes 1010h is provided below in relation to FIGS. 14-15).

The digital media cluster generation engine 1012 can identify, create, and/or determine digital media clusters. In particular, the digital media cluster generating engine can analyze the digital media repository 1022a to generate the digital media clusters 1022b. As described above, the digital media clusters 1022b can include groups of digital media items that share a common feature.

The distribution class manager 1014 can identify distribution classes. In particular, the distribution class manager 1014 can receive distribution classes from the server(s) 106. Moreover, the distribution class manager 1014 can provide the distribution classes to the digital media clustering selector 1016. For its part, the digital media clustering selector 1016 can identify, select, determine, and provide suggested digital media clusters (e.g., select suggested digital media clusters from the digital media clusters generated by the digital media cluster generation engine 1012). As described above, the digital media clustering selector 1016 can analyze distribution classes (received form the server(s) 106) to identify suggested digital media clusters that a user is most likely to distribute in future electronic communications.

The user interface manager 1018 can provide, manage, and/or control a graphical user interface (or simply "user interface"). In particular, the user interface manager 1018 may generate and display a user interface by way of a display screen composed of a plurality of graphical components, objects, and/or elements that allow a user to perform a function. The user interface manager 408 can present a variety of types of information, including text, digital media items, representative digital images corresponding to digital media clusters, images, video, audio, accounts, or other information (e.g., as illustrated above with regard to the user interfaces 704, 804, 904, 910, 914).

The communication manager 1020 can manage digital communications to or from the client device 102a. For example, the communication manager 1020 can transmit select digital media items to the server(s) 106 (e.g., for posting via a networking system). Similarly, the communication manager 1008 can receive distribution classes from the server(s) 106.

The storage manager 1022 maintains data for the digital media clustering system 108 at the client device 102a. The storage manager 1010 can maintain data of any type, size, or kind, as necessary to perform the functions of the digital media clustering system 108, including digital media repository 1022a (e.g., a plurality of digital media items such as a camera roll), digital media clusters 1022b, and digital media cluster model 1022c.

The components 1002-1022c can include software, hardware, or both. For example, the components 1002-1022c include one or more instructions stored on a computer-readable storage medium and executable by processors of one or more computing devices, such as a client device or server device. When executed by the one or more processors, the computer-executable instructions of the computing device 1000 and/or digital media clustering system 108 can cause the computing device(s) to perform the feature learning methods described herein. Alternatively, the components 1002-1022c can include hardware, such as a special-purpose processing device to perform a certain function or group of functions. Alternatively, the components 1002-1022c can include a combination of computer-executable instructions and hardware.

Furthermore, the components 1002-1022c are, for example, implemented as one or more operating systems, as one or more stand-alone applications, as one or more modules of an application, as one or more plug-ins, as one or more library functions or functions called by other applications, and/or as a cloud computing model. Thus, the components 1002-1022c can be implemented as a stand-alone application, such as a desktop or mobile application. Furthermore, the components 1002-1022c can be implemented as one or more web-based applications hosted on a remote server. The components 1002-1022c can also be implemented in a suite of mobile device applications or "apps."

Figure 11:
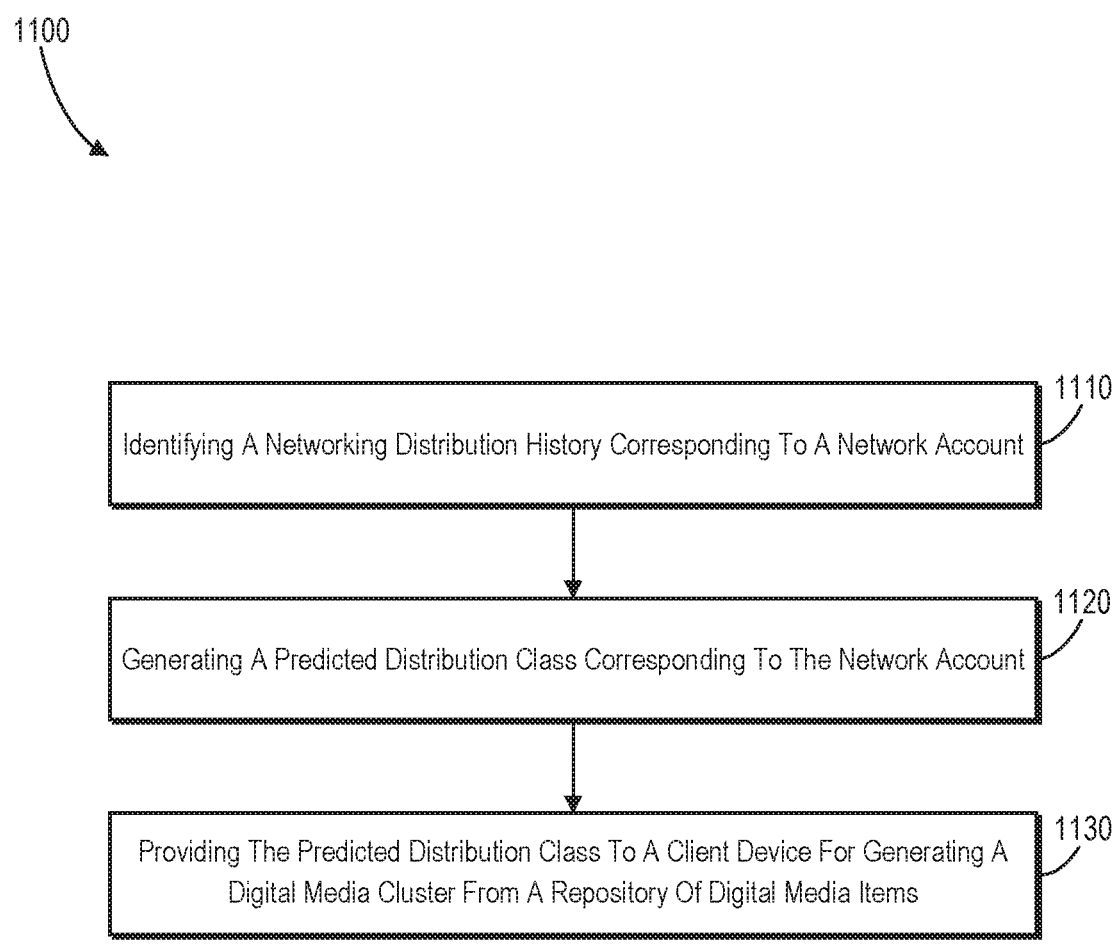
FIG. 11 illustrates a flowchart of a series of acts for generating and providing a predicted distribution class based on a network distribution history in accordance with one or more embodiments.
Figure 12:
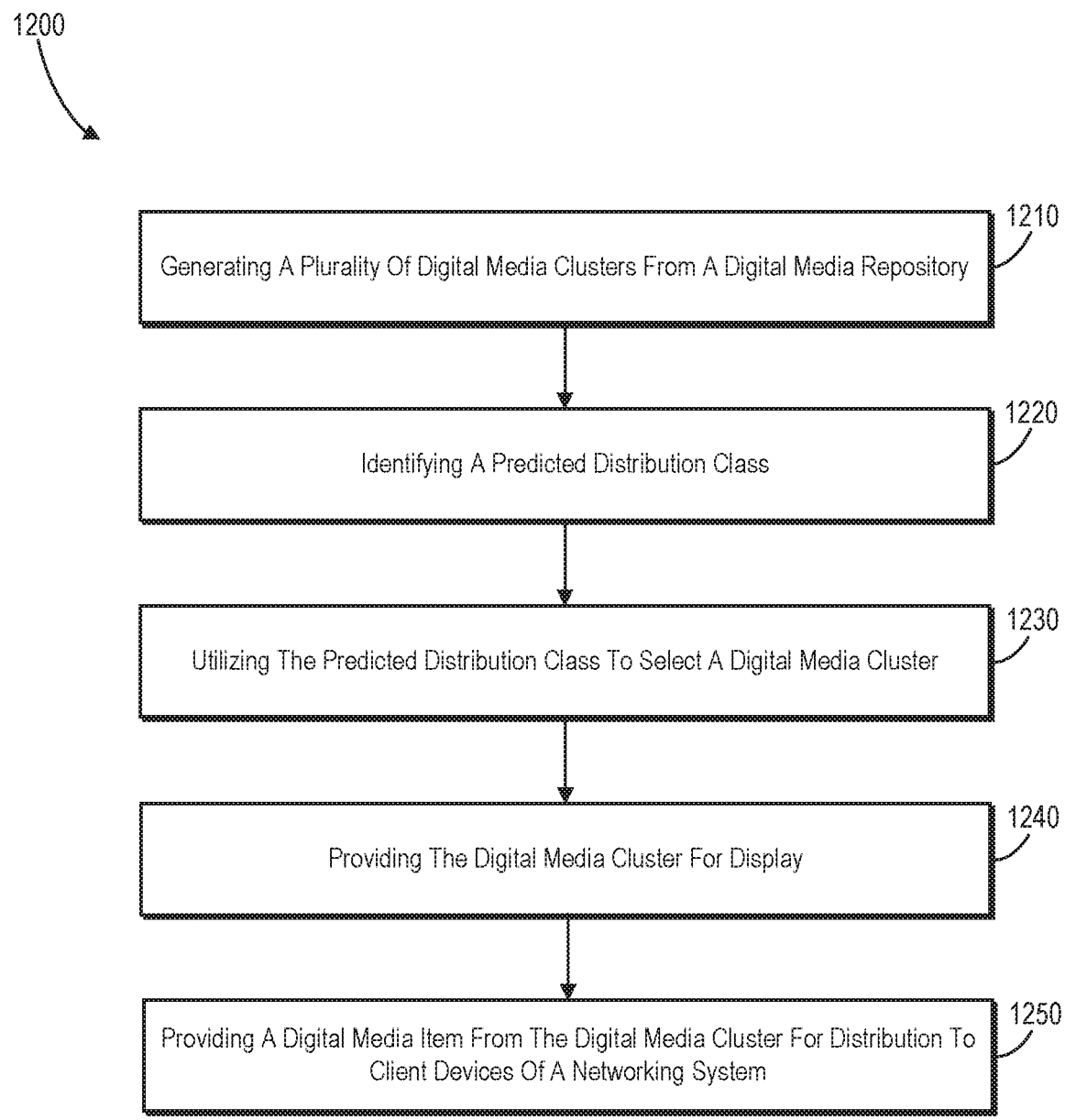
FIG. 12 illustrates a flowchart of a series of acts for generating digital media clusters based on a predicted distribution class in accordance with one or more embodiments.

FIGS. 1-10, the corresponding text, and the examples provide several different systems, methods, techniques, components, and/or devices of the digital media clustering system 108 in accordance with one or more embodiments. In addition to the above description, one or more embodiments can also be described in terms of flowcharts including acts for accomplishing a particular result. For example, FIGS. 11 and 12 illustrates flowcharts of example sequences of acts in accordance with one or more embodiments. In addition, FIGS. 11 and 12 may be performed with more or fewer acts. Further, the acts may be performed in differing orders. Additionally, the acts described herein may be repeated or performed in parallel with one another or parallel with different instances of the same or similar acts.

While FIGS. 11 and 12 illustrate a series of acts 1100 and a series of acts 1200 according to particular embodiments, alternative embodiments may omit, add to, reorder, and/or modify any of the acts shown. The series of acts of FIG. 11 and FIG. 12 can be performed as part of a method. Alternatively, a non-transitory computer-readable medium can comprise instructions, when executed by one or more processors, cause a computing device (e.g., a client device and/or a server device) to perform the series of acts of FIGS. 11 and 12. In still further embodiments, a system performs the acts of FIGS. 11 and 12.

To illustrate, FIG. 11 shows a flowchart of a series of acts 1100 for generating and providing a predicted distribution class based on a network distribution history in accordance with one or more embodiments. As shown, the series of acts 1100 includes the act 1110 of identifying a networking distribution history corresponding to a network account. For example, the act 1110 can include identifying a networking system profile comprising a network distribution history corresponding to a network account of a user. In some embodiments, the act 1110 includes identifying the network distribution history by identifying a plurality of historical posts to a social networking system, wherein the plurality of historical posts comprises a plurality of historical digital media items.

As shown, the series of acts 1100 includes the act 1120 of generating a predicted distribution class corresponding to the network account. For example, the act 1120 can include utilizing a distribution classification model to generate a predicted distribution class for a future electronic communication corresponding to the network account of the user, based on the network distribution history. In some embodiments, the act 1120 includes generating the predicted distribution class from a plurality of distribution classes based on the plurality of historical digital media items.

The series of acts 1100 also includes an act 1130 of providing the predicted distribution class to a client device for generating a digital media cluster from a repository of digital media items. For example, the act 1130 can include providing the predicted distribution class to a client device of the user such that the client device provides for display a digital media cluster corresponding to the predicted distribution class from a repository of digital media items on the client device.

In one or more embodiments, the series of acts 1100 also includes generating the predicted distribution class and provide the predicted distribution class to the client device without receiving information regarding the repository of digital media items on the client device from the client device. Moreover, in some embodiments the series of acts 1110 includes receiving, from the client device, a user indication of a digital media item from the digital media cluster; and in response to receiving the user indication of the digital media item, distributing the digital media item to a plurality of client devices of a plurality of users via the networking system.

Furthermore, the series of acts 1100 can include identifying a plurality of ephemeral digital content items provided by the client device; generating a suggested ephemeral digital content item from the plurality of ephemeral digital content items; and providing the suggested ephemeral digital content item to the client device for display with the digital media cluster corresponding to the predicted distribution class from the repository of digital media items on the client device.

Moreover, the series of acts 1100 can also include identifying an additional network account of the user corresponding to the networking system; determining an additional network distribution history corresponding to the additional network account of the user corresponding to the network system; and utilizing the distribution classification model to generate an additional predicted distribution class for a future electronic communication corresponding to the additional network account of the user based on the additional network distribution history. In addition, the series of acts 1100 can include providing the additional predicted distribution class corresponding to the additional network account of the user to the client device of the user such that the client device provides for display an additional digital media cluster corresponding to the additional predicted distribution class from the repository of digital media items on the client device.

In some embodiments, the series of acts 1100 also includes determining a suggested digital media style modification based on the network distribution history; and providing the suggested digital media style modification to the client device of the user such that the client device modifies a set of digital media items utilizing the suggested digital media style modification and provides the set of digital media items for display in relation to the digital media cluster.

In addition, FIG. 12 shows a flowchart of a series of acts 1200 for generating digital media clusters based on a predicted distribution class in accordance with one or more embodiments. As shown, the series of acts 1200 includes the act 1210 of generating a plurality of digital media clusters from a digital media repository. For example, the act 1210 can include generating a plurality of digital media clusters from a digital media repository on a client device of a user having a network account of a networking system. In some embodiments, the act 1210 includes generating a first cluster based on times corresponding to a first set of digital media items from the digital media repository; generating a second cluster based on locations corresponding to a second set of digital media items from the digital media repository; and generating a third cluster based on one or more common individuals identified in a third set of digital media items from the digital media repository using a facial recognition algorithm.

As shown, the series of acts 1200 includes the act 1220 of identifying a predicted distribution class. For example, the act 1220 can include identifying a predicted distribution class for a future post of the network account of the user, the predicted distribution class based on a network distribution history of the network account. In some embodiments, the act 1220 includes receiving the predicted distribution class from the one or more remote servers without transmitting information regarding the repository of digital media items on the client device to the one or more remote servers.

The series of acts 1200 also includes an act 1230 of utilizing the predicted distribution class to select a digital media cluster. For example, the act 1230 can include utilizing the predicted distribution class to select a digital media cluster from the plurality of digital media clusters. In some embodiments, the act 1230 includes comparing the predicted distribution class with the plurality of digital media clusters.

Additionally, the series of acts 1200 includes an act 1240 of providing the digital media cluster for display. For example, the act 1240 can include providing, for display, the digital media cluster via a user interface of the client device.

Further, the series of acts 1200 includes an act 1250 of providing a digital media item from the digital media cluster for distribution to client devices of a networking system. For example, the act 1250 can include based on user interaction with a digital media item from the digital media cluster, providing the digital media item to one or more remote servers for distribution of the digital media item to client devices of other users of the networking system. The series of acts 1200 can also include identifying a suggested digital media style modification, wherein the suggested digital media style is based on the network distribution history; modifying a set of digital media items by applying the suggested digital media style; and providing the set of digital media items for display in relation to the digital media cluster.

Moreover, the series of acts 1200 can also include identifying an additional network account of the user corresponding to the networking system; identifying an additional predicted distribution class for a future electronic communication corresponding to the additional network account of the user, the additional predicted distribution class based on an additional network distribution history of the additional network account; and utilizing the additional predicted distribution class to select an additional digital media cluster from the plurality of digital media clusters. Further, in some embodiments the series of acts 1200 includes identifying a suggested ephemeral digital content item from a plurality of ephemeral digital content items previously distributed from the network account of the user; and providing the suggested ephemeral digital content item for display with the digital media cluster.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
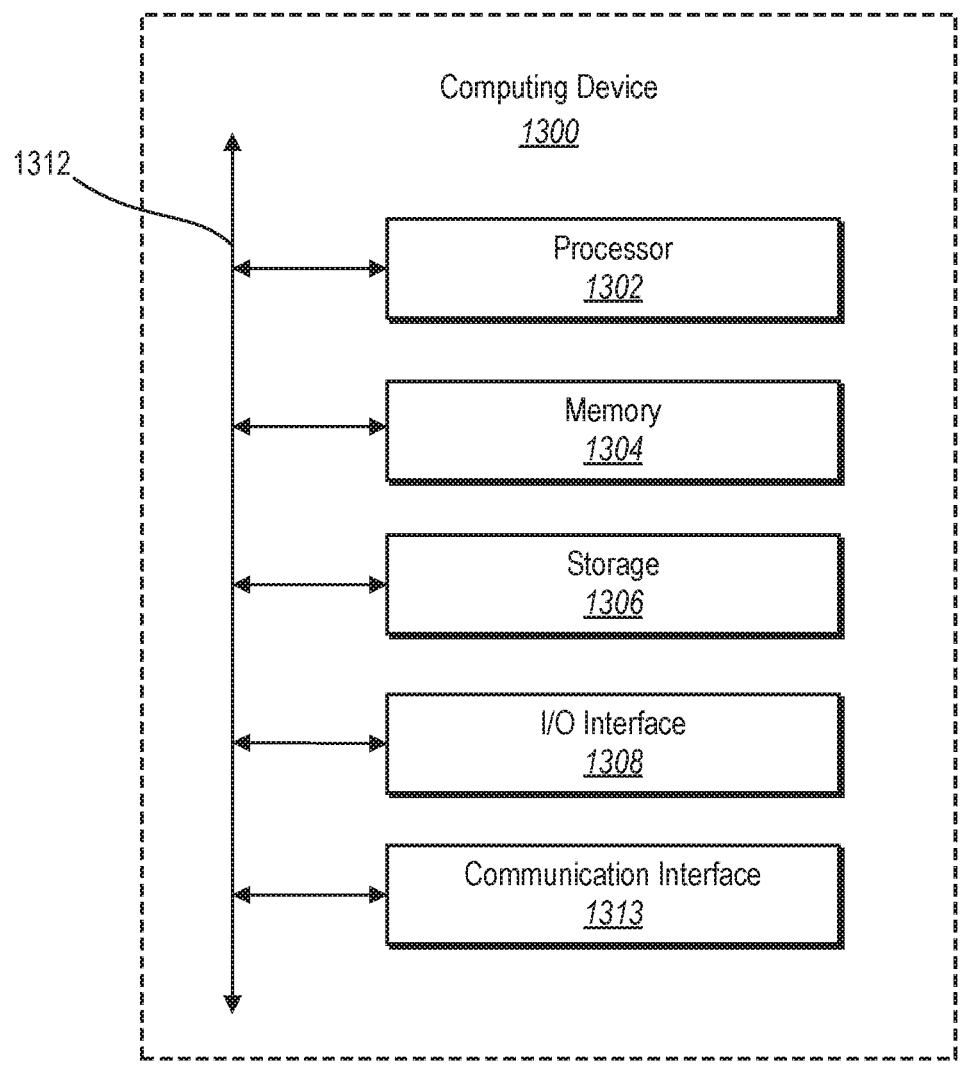
FIG. 13 illustrates a block diagram of an example computing device for implementing one or more embodiments of the present disclosure.

FIG. 13 illustrates a block diagram of exemplary computing device 1300 that may be configured to perform one or more of the processes described above. One will appreciate that one or more computing devices such as the computing device 1300 may implement one or more components the digital media clustering system 108. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. While an exemplary computing device 1300 is shown in FIG. 13, the components illustrated in FIG. 13 are not intended to be limiting. Additional or alternative components may be used in other embodiments. Furthermore, in certain embodiments, the computing device 1300 can include fewer components than those shown in FIG. 13. Components of the computing device 1300 shown in FIG. 13 will now be described in additional detail.

In one or more embodiments, the processor 1302 includes hardware for executing instructions, such as those making up a computer program. As an example and not by way of limitation, to execute instructions, the processor 1302 may retrieve (or fetch) the instructions from an internal register, an internal cache, the memory 1304, or the storage device 1306 and decode and execute them. In one or more embodiments, the processor 1302 may include one or more internal caches for data, instructions, or addresses. As an example and not by way of limitation, the processor 1302 may include one or more instruction caches, one or more data caches, and one or more translation lookaside buffers (TLBs). Instructions in the instruction caches may be copies of instructions in the memory 1304 or the storage device 1306.

The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1304 may be internal or distributed memory.

The storage device 1306 includes storage for storing data or instructions. As an example and not by way of limitation, storage device 1306 can comprise a non-transitory storage medium described above. The storage device 1306 may include a hard disk drive (HDD), a floppy disk drive, flash memory, an optical disc, a magneto-optical disc, magnetic tape, or a Universal Serial Bus (USB) drive or a combination of two or more of these. The storage device 1306 may include removable or non-removable (or fixed) media, where appropriate. The storage device 1306 may be internal or external to the computing device 1300. In one or more embodiments, the storage device 1306 is non-volatile, solid-state memory. In other embodiments, the storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1310 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1310 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1312 may include hardware, software, or both that couples components of the computing device 1300 to each other. As an example and not by way of limitation, the communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, in one or more embodiments, the digital media clustering system 108 operates in connection with a social networking system (e.g., the networking system 110 as described with reference to FIG. 1). In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 14:
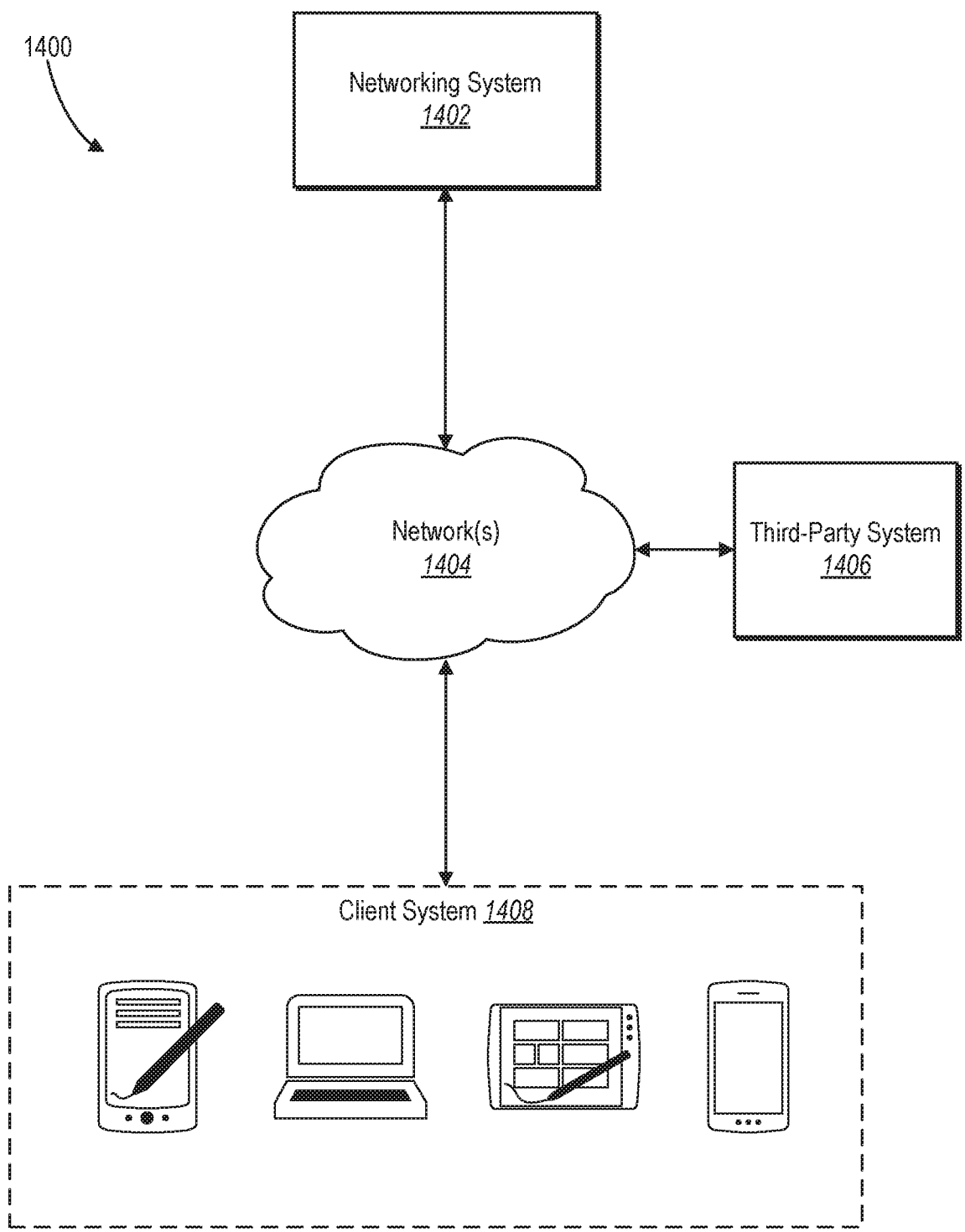
FIG. 14 illustrates an example network environment of a networking system in accordance with one or more embodiments.

FIG. 14 illustrates an example network environment 1400 of a social networking system. Network environment 1400 includes a client device 1406, a networking system 1402 (e.g., a social networking system and/or an electronic messaging system), and a third-party system 1408 connected to each other by a network 1404. Although FIG. 14 illustrates a particular arrangement of client device 1406, networking system 1402, third-party system 1408, and network 1404, this disclosure contemplates any suitable arrangement of client device 1406, networking system 1402, third-party system 1408, and network 1404. As an example and not by way of limitation, two or more of client device 1406, networking system 1402, and third-party system 1408 may be connected to each other directly, bypassing network 1404. As another example, two or more of client device 1406, networking system 1402, and third-party system 1408 may be physically or logically co-located with each other in whole or in part. Moreover, although FIG. 14 illustrates a particular number of client devices 1406, networking systems 1402, third-party systems 1408, and networks 1404, this disclosure contemplates any suitable number of client devices 1406, networking systems 1402, third-party systems 1408, and networks 1404. As an example and not by way of limitation, network environment 1400 may include multiple client device 1406, networking systems 1402, third-party systems 1408, and networks 1404.

This disclosure contemplates any suitable network 1404. As an example and not by way of limitation, one or more portions of network 1404 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1404 may include one or more networks 1404.

Links may connect client device 1406, networking system 1402, and third-party system 1408 to communication network 1404 or to each other. This disclosure contemplates any suitable links. In particular embodiments, one or more links include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1400. One or more first links may differ in one or more respects from one or more second links.

In particular embodiments, client device 1406 may be an electronic device including hardware, software, or embedded logic components or a combination of two or more such components and capable of carrying out the appropriate functionalities implemented or supported by client device 1406. As an example and not by way of limitation, a client device 1406 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1406. A client device 1406 may enable a network user at client device 1406 to access network 1404. A client device 1406 may enable its user to communicate with other users at other client devices 1406.

In particular embodiments, client device 1406 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1406 may enter a Uniform Resource Locator (URL) or other address directing the web browser to a particular server (such as server, or a server associated with a third-party system 1408), and the web browser may generate a Hyper Text Transfer Protocol (HTTP) request and communicate the HTTP request to server. The server may accept the HTTP request and communicate to client device 1406 one or more Hyper Text Markup Language (HTML) files responsive to the HTTP request. Client device 1406 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1402 may be a network-addressable computing system that can host an online social network. Networking system 1402 may generate, store, receive, and send social-networking data, such as, for example, user-profile data, concept-profile data, social-graph information, or other suitable data related to the online social network. Networking system 1402 may be accessed by the other components of network environment 1400 either directly or via network 1404. In particular embodiments, networking system 1402 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1402 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1406, a networking system 1402, or a third-party system 1408 to manage, retrieve, modify, add, or delete, the information stored in data store.

In particular embodiments, networking system 1402 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1402 may provide users of the online social network the ability to communicate and interact with other users. In particular embodiments, users may join the online social network via networking system 1402 and then add connections (e.g., relationships) to a number of other users of networking system 1402 that they want to be connected to. Herein, the term "friend" may refer to any other user of networking system 1402 with whom a user has formed a connection, association, or relationship via networking system 1402.

In particular embodiments, networking system 1402 may provide users with the ability to take actions on various types of items or objects, supported by networking system 1402. As an example and not by way of limitation, the items and objects may include groups or social networks to which users of networking system 1402 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1402 or by an external system of third-party system 1408, which is separate from networking system 1402 and coupled to networking system 1402 via a network 1404.

In particular embodiments, networking system 1402 may be capable of linking a variety of entities. As an example and not by way of limitation, networking system 1402 may enable users to interact with each other as well as receive content from third-party systems 1408 or other entities, or to allow users to interact with these entities through an application programming interfaces (API) or other communication channels.

In particular embodiments, a third-party system 1408 may include one or more types of servers, one or more data stores, one or more interfaces, including but not limited to APIs, one or more web services, one or more content sources, one or more networks, or any other suitable components, e.g., that servers may communicate with. A third-party system 1408 may be operated by a different entity from an entity operating networking system 1402. In particular embodiments, however, networking system 1402 and third-party systems 1408 may operate in conjunction with each other to provide social-networking services to users of networking system 1402 or third-party systems 1408. In this sense, networking system 1402 may provide a platform, or backbone, which other systems, such as third-party systems 1408, may use to provide social-networking services and functionality to users across the Internet.

In particular embodiments, a third-party system 1408 may include a third-party content object provider. A third-party content object provider may include one or more sources of content objects, which may be communicated to a client device 1406. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1402 also includes user-generated content objects, which may enhance a user's interactions with networking system 1402. User-generated content may include anything a user can add, upload, send, or "post" to networking system 1402. As an example and not by way of limitation, a user communicates posts to networking system 1402 from a client device 1406. Posts may include data such as status updates or other textual data, location information, photos, videos, links, music or other similar data or media. Content may also be added to networking system 1402 by a third-party through a "communication channel," such as a newsfeed or stream.

In particular embodiments, networking system 1402 may include a variety of servers, sub-systems, programs, modules, logs, and data stores. In particular embodiments, networking system 1402 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1402 may also include suitable components such as network interfaces, security mechanisms, load balancers, failover servers, management-and-network-operations consoles, other suitable components, or any suitable combination thereof. In particular embodiments, networking system 1402 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1402 to one or more client devices 1406 or one or more third-party system 1408 via network 1404. The web server may include a mail server or other messaging functionality for receiving and routing messages between networking system 1402 and one or more client devices 1406. An API-request server may allow a third-party system 1408 to access information from networking system 1402 by calling one or more APIs. An action logger may be used to receive communications from a web server about a user's actions on or off networking system 1402. In conjunction with the action log, a third-party-content-object log may be maintained of user exposures to third-party-content objects. A notification controller may provide information regarding content objects to a client device 1406. Information may be pushed to a client device 1406 as notifications, or information may be pulled from client device 1406 responsive to a request received from client device 1406. Authorization servers may be used to enforce one or more privacy settings of the users of networking system 1402. A privacy setting of a user determines how particular information associated with a user can be shared. The authorization server may allow users to opt in to or opt out of having their actions logged by networking system 1402 or shared with other systems (e.g., third-party system 1408), such as, for example, by setting appropriate privacy settings. Third-party-content-object stores may be used to store content objects received from third parties, such as a third-party system 1408. Location stores may be used for storing location information received from client devices 1406 associated with users. Advertisement-pricing modules may combine social information, the current time, location information, or other suitable information to provide relevant advertisements, in the form of notifications, to a user.

Figure 15:
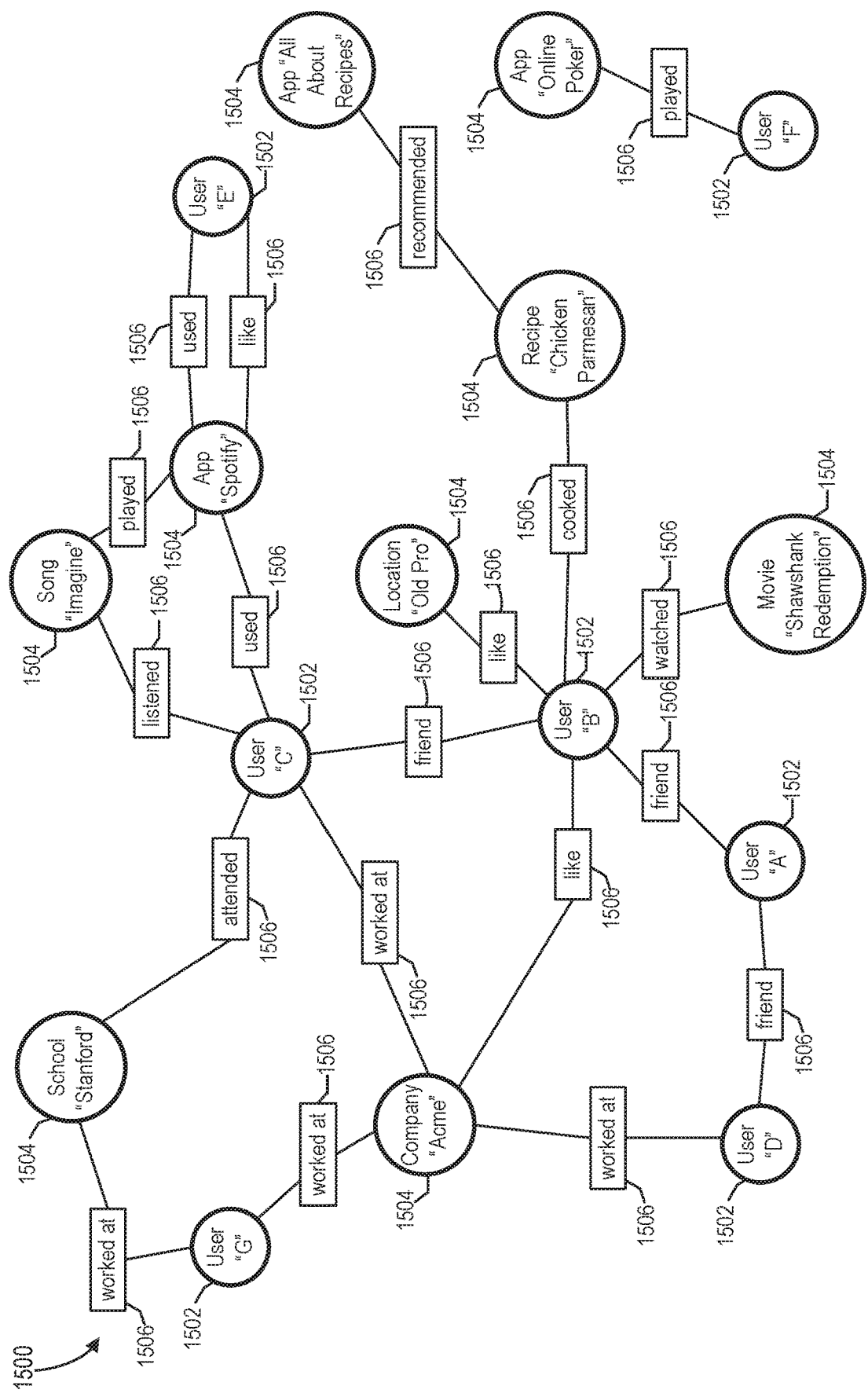
FIG. 15 illustrates a social graph in accordance with one or more embodiments.

FIG. 15 illustrates example social graph 1500. In particular embodiments, networking system 1402 may store one or more social graphs 1500 in one or more data stores. In particular embodiments, social graph 1500 may include multiple nodes—which may include multiple user nodes 1502 or multiple concept nodes 1504—and multiple edges 1506 connecting the nodes. Example social graph 1500 illustrated in FIG. 15 is shown, for didactic purposes, in a two-dimensional visual map representation. In particular embodiments, a networking system 1402, client device 1406, or third-party system 1408 may access social graph 1500 and related social-graph information for suitable applications. The nodes and edges of social graph 1500 may be stored as data objects, for example, in a data store (such as a social-graph database). Such a data store may include one or more searchable or query able indexes of nodes or edges of social graph 1500.

In particular embodiments, a user node 1502 may correspond to a user of networking system 1402. As an example and not by way of limitation, a user may be an individual (human user), an entity (e.g., an enterprise, business, or third-party application), or a group (e.g., of individuals or entities) that interacts or communicates with or over networking system 1402. In particular embodiments, when a user registers for an account with networking system 1402, networking system 1402 may create a user node 1502 corresponding to the user, and store the user node 1502 in one or more data stores. Users and user nodes 1502 described herein may, where appropriate, refer to registered users and user nodes 1502 associated with registered users. In addition or as an alternative, users and user nodes 1502 described herein may, where appropriate, refer to users that have not registered with networking system 1402. In particular embodiments, a user node 1502 may be associated with information provided by a user or information gathered by various systems, including networking system 1402. As an example and not by way of limitation, a user may provide his or her name, profile picture, contact information, birth date, sex, marital status, family status, employment, education background, preferences, interests, or other demographic information. In particular embodiments, a user node 1502 may be associated with one or more data objects corresponding to information associated with a user. In particular embodiments, a user node 1502 may correspond to one or more webpages.

In particular embodiments, a concept node 1504 may correspond to a concept. As an example and not by way of limitation, a concept may correspond to a place (such as, for example, a movie theater, restaurant, landmark, or city); a website (such as, for example, a website associated with networking system 1402 or a third-party website associated with a web-application server); an entity (such as, for example, a person, business, group, sports team, or celebrity); a resource (such as, for example, an audio file, video file, digital photo, text file, structured document, or application) which may be located within networking system 1402 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1504 may be associated with information of a concept provided by a user or information gathered by various systems, including networking system 1402. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1504 may be associated with one or more data objects corresponding to information associated with concept node 1504. In particular embodiments, a concept node 1504 may correspond to one or more webpages.

In particular embodiments, a node in social graph 1500 may represent or be represented by a webpage (which may be referred to as a "profile page"). Profile pages may be hosted by or accessible to networking system 1402. Profile pages may also be hosted on third-party websites associated with a third-party system 1408. As an example and not by way of limitation, a profile page corresponding to a particular external webpage may be the particular external webpage and the profile page may correspond to a particular concept node 1504. Profile pages may be viewable by all or a selected subset of other users. As an example and not by way of limitation, a user node 1502 may have a corresponding user-profile page in which the corresponding user may add content, make declarations, or otherwise express himself or herself. As another example and not by way of limitation, a concept node 1504 may have a corresponding concept-profile page in which one or more users may add content, make declarations, or express themselves, particularly in relation to the concept corresponding to concept node 1504.

In particular embodiments, a concept node 1504 may represent a third-party webpage or resource hosted by a third-party system 1408. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1406 to send to networking system 1402 a message indicating the user's action. In response to the message, networking system 1402 may create an edge (e.g., an "eat" edge) between a user node 1502 corresponding to the user and a concept node 1504 corresponding to the third-party webpage or resource and store edge 1506 in one or more data stores.

In particular embodiments, a pair of nodes in social graph 1500 may be connected to each other by one or more edges 1506. An edge 1506 connecting a pair of nodes may represent a relationship between the pair of nodes. In particular embodiments, an edge 1506 may include or represent one or more data objects or attributes corresponding to the relationship between a pair of nodes. As an example and not by way of limitation, a first user may indicate that a second user is a "friend" of the first user. In response to this indication, networking system 1402 may send a "friend request" to the second user. If the second user confirms the "friend request," networking system 1402 may create an edge 1506 connecting the first user's user node 1502 to the second user's user node 1502 in social graph 1500 and store edge 1506 as social-graph information in one or more of data stores. In the example of FIG. 15, social graph 1500 includes an edge 1506 indicating a friend relation between user nodes 1502 of user "A" and user "B" and an edge indicating a friend relation between user nodes 1502 of user "C" and user "B." Although this disclosure describes or illustrates particular edges 1506 with particular attributes connecting particular user nodes 1502, this disclosure contemplates any suitable edges 1506 with any suitable attributes connecting user nodes 1502. As an example and not by way of limitation, an edge 1506 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1500 by one or more edges 1506.

In particular embodiments, an edge 1506 between a user node 1502 and a concept node 1504 may represent a particular action or activity performed by a user associated with user node 1502 toward a concept associated with a concept node 1504. As an example and not by way of limitation, as illustrated in FIG. 15, a user may "like," "attended," "played," "listened," "cooked," "worked at," or "watched" a concept, each of which may correspond to an edge type or subtype. A concept-profile page corresponding to a concept node 1504 may include, for example, a selectable "check in" icon (such as, for example, a clickable "check in" icon) or a selectable "add to favorites" icon. Similarly, after a user clicks these icons, networking system 1402 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 1402 may create a "listened" edge 1506 and a "used" edge (as illustrated in FIG. 15) between user nodes 1502 corresponding to the user and concept nodes 1504 corresponding to the song and application to indicate that the user listened to the song and used the application. Moreover, networking system 1402 may create a "played" edge 1506 (as illustrated in FIG. 15) between concept nodes 1504 corresponding to the song and the application to indicate that the particular song was played by the particular application. In this case, "played" edge 1506 corresponds to an action performed by an external application (SPOTIFY) on an external audio file (the song "Imagine"). Although this disclosure describes particular edges 1506 with particular attributes connecting user nodes 1502 and concept nodes 1504, this disclosure contemplates any suitable edges 1506 with any suitable attributes connecting user nodes 1502 and concept nodes 1504. Moreover, although this disclosure describes edges between a user node 1502 and a concept node 1504 representing a single relationship, this disclosure contemplates edges between a user node 1502 and a concept node 1504 representing one or more relationships. As an example and not by way of limitation, an edge 1506 may represent both that a user likes and has used at a particular concept. Alternatively, another edge 1506 may represent each type of relationship (or multiples of a single relationship) between a user node 1502 and a concept node 1504 (as illustrated in FIG. 15 between user node 1502 for user "E" and concept node 1504 for "SPOTIFY").

In particular embodiments, networking system 1402 may create an edge 1506 between a user node 1502 and a concept node 1504 in social graph 1500. As an example and not by way of limitation, a user viewing a concept-profile page (such as, for example, by using a web browser or a special-purpose application hosted by the user's client device 1406) may indicate that he or she likes the concept represented by the concept node 1504 by clicking or selecting a "Like" icon, which may cause the user's client device 1406 to send to networking system 1402 a message indicating the user's liking of the concept associated with the concept-profile page. In response to the message, networking system 1402 may create an edge 1506 between user node 1502 associated with the user and concept node 1504, as illustrated by "like" edge 1506 between the user and concept node 1504. In particular embodiments, networking system 1402 may store an edge 1506 in one or more data stores. In particular embodiments, an edge 1506 may be automatically formed by networking system 1402 in response to a particular user action. As an example and not by way of limitation, if a first user uploads a picture, watches a movie, or listens to a song, an edge 1506 may be formed between user node 1502 corresponding to the first user and concept nodes 1504 corresponding to those concepts. Although this disclosure describes forming particular edges 1506 in particular manners, this disclosure contemplates forming any suitable edges 1506 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 1402). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1402 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1402) or RSVP (e.g., through networking system 1402) to an event associated with the advertisement. In addition or as an alternative, an advertisement may include social-networking-system context directed to the user. As an example and not by way of limitation, an advertisement may display information about a friend of the user within networking system 1402 who has taken an action associated with the subject matter of the advertisement.

In particular embodiments, networking system 1402 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1408 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1402 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1402 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1402 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1402 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1402 may calculate a coefficient based on a user's actions. Networking system 1402 may monitor such actions on the online social network, on a third-party system 1408, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1402 may calculate a coefficient based on the user's actions with particular types of content. The content may be associated with the online social network, a third-party system 1408, or another suitable system. The content may include users, profile pages, posts, news stories, headlines, instant messages, chat room conversations, emails, advertisements, pictures, video, music, other suitable objects, or any combination thereof. Networking system 1402 may analyze a user's actions to determine whether one or more of the actions indicate an affinity for subject matter, content, other users, and so forth. As an example and not by way of limitation, if a user may make frequently posts content related to "coffee" or variants thereof, networking system 1402 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1402 may calculate a coefficient based on the type of relationship between particular objects. Referencing the social graph 1500, networking system 1402 may analyze the number and/or type of edges 1506 connecting particular user nodes 1502 and concept nodes 1504 when calculating a coefficient. As an example and not by way of limitation, user nodes 1502 that are connected by a spouse-type edge (representing that the two users are married) may be assigned a higher coefficient than a user node 1502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1402 may determine that the user has a higher coefficient with respect to the first photo than the second photo because having a tagged-in-type relationship with content may be assigned a higher weight and/or rating than having a like-type relationship with content. In particular embodiments, networking system 1402 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1402 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1500. As an example and not by way of limitation, social-graph entities that are closer in the social graph 1500 (i.e., fewer degrees of separation) may have a higher coefficient than entities that are further apart in the social graph 1500.

In particular embodiments, networking system 1402 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device of the user). A first user may be more interested in other users or concepts that are closer to the first user. As an example and not by way of limitation, if a user is one mile from an airport and two miles from a gas station, networking system 1402 may determine that the user has a higher coefficient for the airport than the gas station based on the proximity of the airport to the user.

In particular embodiments, networking system 1402 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1402 may provide information that is relevant to user's interests and current circumstances, increasing the likelihood that they will find such information of interest. In particular embodiments, networking system 1402 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1402 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1402 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1408 (e.g., via an API or other communication channel), or from another suitable system. In response to the request, networking system 1402 may calculate the coefficient (or access the coefficient information if it has previously been calculated and stored). In particular embodiments, networking system 1402 may measure an affinity with respect to a particular process. Different processes (both internal and external to the online social network) may request a coefficient for a particular object or set of objects. Networking system 1402 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1504 corresponding to a particular photo may have a privacy setting specifying that the photo may only be accessed by users tagged in the photo and their friends. In particular embodiments, privacy settings may allow users to opt in or opt out of having their actions logged by networking system 1402 or shared with other systems (e.g., third-party system 1408). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1408, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1402 may send a request to the data store for the object. The request may identify the user associated with the request and may only be sent to the user (or a client device 1406 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   a non-transitory computer memory comprising instructions that, when executed by the at least one processor, cause the system to:
   identify a networking system profile comprising a network distribution history corresponding to a network account of a user of a networking system;
   utilize a distribution classification model to generate a predicted distribution class for a future electronic communication from the network account of the user to an account of an additional network user, based on the network distribution history;

provide the predicted distribution class to a client device of the user such that the client device selects and provides for display a digital media cluster from a repository of digital media items on the client device based on the predicted distribution class; and receive an electronic communication from the client device of the user comprising a digital media item of the digital media cluster selected from the repository of digital media items on the client device of the user based on the predicted distribution class.

2. The system of claim 1, further comprising instructions that, when executed by the at least one processor, cause the system to generate the predicted distribution class and provide the predicted distribution class to the client device without receiving information regarding the repository of digital media items on the client device from the client device.

3. The system of claim 1, further comprising instructions that, when executed by the at least one processor, cause the system to:

in response to receiving the electronic communication from the client device of the user, distribute the digital media item to a plurality of client devices of a plurality of users via the networking system.

4. The system of claim 1, further comprising instructions that, when executed by the at least one processor, cause the system to:

identify a plurality of ephemeral digital content items provided by the client device;

generate a suggested ephemeral digital content item from the plurality of ephemeral digital content items; and provide the suggested ephemeral digital content item to the client device for display with the digital media cluster corresponding to the predicted distribution class from the repository of digital media items on the client device.

5. The system of claim 1, further comprising instructions that, when executed by the at least one processor, cause the system to:

identify the network distribution history by identifying a plurality of historical posts to a social networking system, wherein the plurality of historical posts comprise a plurality of historical digital media items; and generate the predicted distribution class from a plurality of distribution classes based on the plurality of historical digital media items.

6. The system of claim 1, further comprising instructions that, when executed by the at least one processor, cause the system to:

identify an additional network account of the user corresponding to the networking system;

determine an additional network distribution history corresponding to the additional network account of the user corresponding to the networking system; and utilize the distribution classification model to generate an additional predicted distribution class for a future electronic communication corresponding to the additional network account of the user based on the additional network distribution history.

7. The system of claim 6, further comprising instructions that, when executed by the at least one processor, cause the system to provide the additional predicted distribution class corresponding to the additional network account of the user to the client device of the user such that the client device provides for display an additional digital media cluster corresponding to the additional predicted distribution class from the repository of digital media items on the client device.

8. The system of claim 1, further comprising instructions that, when executed by the at least one processor, cause the system to:

determine a suggested digital media style modification based on the network distribution history; and provide the suggested digital media style modification to the client device of the user such that the client device modifies a set of digital media items utilizing the suggested digital media style modification and provides the set of digital media items for display in relation to the digital media cluster.

9. A non-transitory computer-readable storage medium comprising instructions that, when executed by at least one processor, cause a computer system to:

generate a plurality of digital media clusters from a digital media repository on a client device of a user having a network account of a networking system;

receive, from a remote server, a predicted distribution class for a future post of the network account of the user, the predicted distribution class based on a network distribution history of the network account;

utilize the predicted distribution class for the future post of the network account of the user to select a digital media cluster on the client device from the plurality of digital media clusters on the client device;

provide, for display, the digital media cluster via a user interface of the client device; and based on user interaction with a digital media item from the digital media cluster, provide the digital media item to one or more remote servers for distribution of the digital media item to client devices of other users of the networking system.

10. The non-transitory computer-readable storage medium of claim 9, further comprising instructions that, when executed by the at least one processor, cause the computer system to identify the predicted distribution class by receiving the predicted distribution class from the one or more remote servers without transmitting information regarding the digital media repository on the client device to the one or more remote servers.

11. The non-transitory computer-readable storage medium of claim 9, wherein the plurality of digital media clusters correspond to a plurality of distribution classes and further comprising instructions that, when executed by the at least one processor, cause the computer system to select the digital media cluster from the plurality of digital media clusters by comparing the predicted distribution class with the plurality of digital media clusters.

12. The non-transitory computer-readable storage medium of claim 9, further comprising instructions that, when executed by the at least one processor, cause the computer system to generate the plurality of digital media clusters by:

generating a first cluster based on times corresponding to a first set of digital media items from the digital media repository;

generating a second cluster based on locations corresponding to a second set of digital media items from the digital media repository; and generating a third cluster based on one or more common individuals identified in a third set of digital media items from the digital media repository using a facial recognition algorithm.

13. The non-transitory computer-readable storage medium of claim 9, further comprising instructions that, when executed by the at least one processor, cause the computer system to:
- identify a suggested digital media style modification, wherein the suggested digital media style modification is based on the network distribution history;
- generate a modified set of digital media items by applying the suggested digital media style modification; and
- provide the modified set of digital media items for display in relation to the digital media cluster.

14. The non-transitory computer-readable storage medium of claim 9, further comprising instructions that, when executed by the at least one processor, cause the computer system to:
- identify an additional network account of the user corresponding to the networking system;
- identify an additional predicted distribution class for a future electronic communication corresponding to the additional network account of the user, the additional predicted distribution class based on an additional network distribution history of the additional network account; and
- utilize the additional predicted distribution class to select an additional digital media cluster from the plurality of digital media clusters.

15. The non-transitory computer-readable storage medium of claim 9, further comprising instructions that, when executed by the at least one processor, cause the computer system to:
- identify a suggested ephemeral digital content item from a plurality of ephemeral digital content items previously distributed from the network account of the user; and
- provide the suggested ephemeral digital content item for display with the digital media cluster.

16. A computer-implemented method comprising:
- identifying a networking system profile comprising a network distribution history corresponding to a network account of a user of a networking system;
- utilizing a distribution classification model to generate a predicted distribution class for a future electronic communication from the network account of the user, to an account of an additional network user, based on the network distribution history;
- providing the predicted distribution class to a client device of the user such that the client device selects and provides for display a digital media cluster from a repository of digital media items on the client device based on the predicted distribution class; and
- receive an electronic communication from the client device of the user comprising a digital media item of a digital media cluster selected from a repository of digital media items on the client device of the user based on the predicted distribution class.

17. The computer-implemented method of claim 16, further comprising generating the predicted distribution class and providing the predicted distribution class to the client device without receiving information regarding the repository of digital media items on the client device from the client device.

18. The computer-implemented method of claim 16, further comprising:
- in response to receiving the electronic communication from the client device of the user, distributing the digital media item to a plurality of client devices of a plurality of users via the networking system.

19. The computer-implemented method of claim 16, further comprising:
- identifying the network distribution history by identifying a plurality of historical posts to a social networking system, wherein the plurality of historical posts comprise a plurality of historical digital media items; and
- generating the predicted distribution class from a plurality of distribution classes based on the plurality of historical digital media items.

20. The computer-implemented method of claim 16, further comprising:
- identifying a plurality of ephemeral digital content items corresponding to the network account;
- generating a suggested ephemeral digital content item from the plurality of ephemeral digital content items; and
- providing the suggested ephemeral digital content item to the client device for display with the digital media cluster corresponding to the predicted distribution class from the repository of digital media items on the client device.

* * * * *